United States Patent
Kaushik et al.

(10) Patent No.: US 9,422,428 B2
(45) Date of Patent: Aug. 23, 2016

(54) ELASTOMERIC COMPOSITION HAVING OIL RESISTANCE

(71) Applicant: Ticona LLC, Florence, KY (US)

(72) Inventors: Mukul Kaushik, Florence, KY (US); Dirk Ronald Zierer, Hofheim (DE); Jeffrey Charles Haley, Norwood, OH (US); Dirk Hair, Edmonton (CA); Dale Zevotek, Bethel, OH (US)

(73) Assignee: Ticona LLC, Florence, KY (US)

( * ) Notice: Subject to any disclaimer, the term of this patent is extended or adjusted under 35 U.S.C. 154(b) by 0 days.

(21) Appl. No.: 14/681,500

(22) Filed: Apr. 8, 2015

(65) Prior Publication Data

US 2015/0299458 A1    Oct. 22, 2015

Related U.S. Application Data

(60) Provisional application No. 61/980,781, filed on Apr. 17, 2014.

(51) Int. Cl.
*C08L 67/00* (2006.01)

(52) U.S. Cl.
CPC ............ *C08L 67/00* (2013.01); *C08L 2207/04* (2013.01)

(58) Field of Classification Search
CPC ............................ C08L 67/00; C08L 2207/04
USPC .................. 524/433, 502; 525/450, 474, 479
See application file for complete search history.

(56) References Cited

U.S. PATENT DOCUMENTS

| | | | |
|---|---|---|---|
| 3,847,657 A | 11/1974 | Rieber et al. | |
| 4,085,082 A | 4/1978 | Lamb et al. | |
| 4,191,678 A | 3/1980 | Smith | |
| 4,243,576 A | 1/1981 | Fischer et al. | |
| 4,403,007 A | 9/1983 | Coughlin | |
| 4,514,529 A | 4/1985 | Beers et al. | |
| 4,970,249 A | 11/1990 | Joswig et al. | |
| 5,043,371 A | 8/1991 | Nakano et al. | |
| 5,225,482 A | 7/1993 | Nakagawa et al. | |
| 5,234,986 A | 8/1993 | McBride | |
| 5,250,349 A | 10/1993 | Nakagawa et al. | |
| 5,789,046 A | 8/1998 | Mueller | |
| 5,895,718 A | 4/1999 | Ishimura et al. | |
| 6,074,738 A | 6/2000 | Von Fragstein et al. | |
| 6,235,824 B1 | 5/2001 | Vander Louw et al. | |
| 6,380,312 B1 | 4/2002 | Maldonado | |
| 6,444,740 B1 | 9/2002 | DeCato et al. | |
| 6,526,859 B1 | 3/2003 | Ozawa et al. | |
| 6,815,496 B2 | 11/2004 | Tasaka et al. | |
| 6,872,775 B2 | 3/2005 | Greulich et al. | |
| 7,097,926 B2 | 8/2006 | Shih | |
| 7,119,152 B1 | 10/2006 | Lacroix et al. | |
| 7,419,708 B2 | 9/2008 | Kobayashi et al. | |
| 7,585,561 B2 | 9/2009 | Kobayashi et al. | |
| 7,647,949 B2 | 1/2010 | Donohue et al. | |
| 7,811,371 B2 | 10/2010 | Gustafsson et al. | |
| 7,943,694 B2 | 5/2011 | Varnhorn et al. | |
| 8,178,647 B2 | 5/2012 | Hawkins et al. | |
| 8,188,172 B2 | 5/2012 | Elango et al. | |
| 8,252,886 B2 | 8/2012 | Kim et al. | |
| 8,335,783 B2 | 12/2012 | Milby | |
| 8,399,556 B2 | 3/2013 | Siddhamalli et al. | |
| 8,470,922 B2 | 6/2013 | Jacob | |
| 8,637,364 B2 | 1/2014 | Ueda | |
| 8,987,597 B2 | 3/2015 | Tai et al. | |
| 2001/0009948 A1 | 7/2001 | Hopkins et al. | |
| 2002/0151647 A1 | 10/2002 | Laughner et al. | |
| 2004/0059063 A1 | 3/2004 | Yang et al. | |
| 2004/0176548 A1 | 9/2004 | Heidkanen et al. | |
| 2006/0006132 A1* | 1/2006 | Lauer ................ | B65D 39/0005 215/355 |
| 2006/0175325 A1 | 8/2006 | Day | |
| 2006/0199911 A1* | 9/2006 | Markovich ......... | C08L 23/0815 525/192 |
| 2009/0203276 A1 | 8/2009 | Kutsenko et al. | |
| 2009/0283931 A1 | 11/2009 | Pfeiffer et al. | |
| 2010/0068435 A1 | 3/2010 | Uradnisheck | |
| 2010/0080943 A1 | 4/2010 | Uradnisheck | |
| 2010/0132099 A1 | 6/2010 | Green et al. | |
| 2010/0227143 A1 | 9/2010 | Mulholland | |
| 2011/0009526 A1 | 1/2011 | Jungqvist et al. | |
| 2011/0112219 A1 | 5/2011 | Schachtely et al. | |
| 2011/0237695 A1 | 9/2011 | Hoerold et al. | |
| 2011/0294955 A1 | 12/2011 | Akiba | |
| 2011/0294961 A1 | 12/2011 | Akiba | |

(Continued)

FOREIGN PATENT DOCUMENTS

| | | |
|---|---|---|
| CA | 2013592 | 10/1990 |
| CA | 1319772 | 6/1993 |

(Continued)

OTHER PUBLICATIONS

International Search Report and Written Opinion for PCT/US2015/024936, dated Jun. 29, 2015, 12 pages.
U.S. Appl. No. 14/607,180, Zhang et al., filed Jan. 28, 2015.
Dupont Packaging & Industrial Polymers at al., Dupont (TM) Elvax 260 Product Data Sheet, Feb. 16, 2011, pp. 1-3.
Lanxess Deutschland Gmbh et al., Product Data Sheet Levapren 400, May 22, 2007, pp. 1-2.

(Continued)

*Primary Examiner* — Kelechi Egwim

(74) *Attorney, Agent, or Firm* — Dority & Manning, P.A.

(57) ABSTRACT

An oil resistant polymer composition is disclosed that contains a thermoplastic elastomer combined with an olefin and vinyl acetate copolymer on an oleophobic agent. In one embodiment, the composition contains a thermoplastic polyester elastomer combined with an ethylene and vinyl acetate copolymer. In order to render the polymer composition oil resistant, the polymer composition can further contain an UHMW silicone, a fluoropolymer, and optionally a cross-linking agent and/or an antiplasticizer.

17 Claims, 7 Drawing Sheets

(56) References Cited

U.S. PATENT DOCUMENTS

| | | |
|---|---|---|
| 2012/0010336 A1 | 1/2012 | Levchik et al. |
| 2012/0048380 A1 | 3/2012 | Thomas et al. |
| 2012/0053568 A1 | 3/2012 | Hawkins et al. |
| 2012/0129992 A1 | 5/2012 | Kang et al. |
| 2012/0132457 A1 | 5/2012 | Tai et al. |
| 2012/0301658 A1 | 11/2012 | Levchik et al. |
| 2012/0308819 A1 | 12/2012 | Ni |
| 2013/0085214 A1 | 4/2013 | Mulholland |
| 2014/0058019 A1 | 2/2014 | Na et al. |
| 2014/0079898 A1 | 3/2014 | Kaushik et al. |

FOREIGN PATENT DOCUMENTS

| | | |
|---|---|---|
| EP | 2098570 | 9/2009 |
| JP | S 60212456 | 10/1985 |
| JP | H 01236260 | 9/1989 |
| JP | 2001139707 | 5/2001 |
| JP | 2001261854 | 9/2001 |
| JP | 2001261855 | 9/2001 |
| JP | 2007219325 | 8/2007 |
| KR | 20020074646 | 10/2002 |
| KR | 20120096803 | 8/2012 |
| WO | WO 2009/155294 | 12/2009 |
| WO | WO 2013/085788 | 6/2013 |

* cited by examiner

ELASTOMERIC COMPOSITION HAVING OIL RESISTANCE

RELATED APPLICATIONS

The present application claims priority to U.S. Provisional Application Ser. No. 61/980,781, filed on Apr. 17, 2014, which is incorporated herein in its entirety by reference thereto.

BACKGROUND OF THE INVENTION

Thermoplastic elastomers are a class of useful materials that have a unique combination of properties. The materials, for instance, can be formulated so as to be flexible and tough, while having elastic characteristics. Of particular advantage, the materials can also be melt processed due to their thermoplastic nature. Furthermore, unlike their cross-linked rubber counterparts, thermoplastic elastomers can be recycled and reprocessed.

Thermoplastic elastomers are used in numerous applications. The materials, for instance, may be molded to form a particular part or product or may comprise a component in a product. In addition, these materials may also be over-molded allowing for an additional layer to be formed on an initially molded part. Due to their flexible and elastic nature, thermoplastic elastomers are commonly used in applications where the material constantly undergoes deformation or otherwise contacts other moving parts.

Although thermoplastic elastomers can be used in numerous applications, problems have been experienced in the past in processing the elastomers. For instance, some thermoplastic elastomers have relatively high viscosities that cause problems in filling mold cavities. Other thermoplastic elastomers may have low melt strength which causes issues during extrusion and blow molding. In addition, some thermoplastic elastomers are not only expensive to produce, but also may darken or yellow in color over time. In addition, weathering may also affect the mechanical and thermal properties of the thermoplastic elastomers over time.

In order to correct some of the above noted problems, thermoplastic elastomers have been combined with other polymers. For example, mixtures of thermoplastic elastomers and an ethylene vinyl acetate copolymer have been proposed. In fact, the combination of a thermoplastic polyester elastomer and an ethylene vinyl acetate copolymer has shown to produce a polymer composition having many useful properties. Further improvements, however, are still needed.

For instance, oil resistance can be an important characteristic or property for a thermoplastic elastomer composition that is used to produce automotive parts, machine parts, and articles constantly in touch with the human body, such as handles, knobs and grips. Repeated contact with oils, for instance, can cause some elastomers to not only discolor, but also to experience a loss in mechanical properties. For example, human skin secretes sebum, which is known to attack polymer chains and reduce molecular weight. Also, artificial sebum may be applied to skin and is made of natural and artificial chemicals such as unsaturated and saturated fatty acids (e.g. oleic acid, stearic acid, palmitic acid) triglyceride oils etc.

Although adding an ethylene vinyl acetate copolymer to an elastomer can improve the oil resistance properties of the elastomer, the resulting composition is still susceptible to degradation when repeatedly contacted with oils in some applications. Thus, a need still remains for an elastomeric composition that has improved oil resistance.

A need also exists for molded articles made from an elastomer, such as a polyester elastomer, that display a metallic finish in addition to having improved oil resistance.

SUMMARY

In general, the present disclosure is directed to polymer compositions containing a thermoplastic elastomer blended and/or compounded with a second polymer, such as an olefin and vinyl acetate copolymer and at least one oleophobic agent. The oleophobic agent increases the oil resistance of the composition without compromising other properties. In particular, the presence of the oleophobic agent can reduce discoloration when contacted with oils and/or inhibit the degradation of mechanical properties.

Different types of oleophobic agents may be used in accordance with the present disclosure. In one embodiment, the oleophobic agent comprises an ultrahigh molecular weight silicone, such as polydimethyl siloxanes or their copolymers with various functional groups. The ultrahigh molecular weight silicone, for instance, may have a kinematic viscosity of greater than about 100,000 $mm^2s^{-1}$.

In another embodiment, the oleophobic agent comprises a fatty acid amide. For instance, the oleophobic agent may comprise erucamide, bisstearamide, bisdodecanamide, ethylene bis oleamides, oleamide, stearamide, behenamide, oleyl palmitamide, stearyl erucamide, ethylene bis stearamide, or combinations thereof. It is believed that amide based surfactants act as a thin oleophobic layer on the surface. The hydrocarbon chain is completely miscible in the polymer bulk and polar amide group migrates to the surface. In certain embodiments, a fatty acid amide may not display strong oleophobic properties. However, when present in the composition, the fatty acid amide does improve oil resistance. Consequently, as used herein, an oleophobic agent includes fatty acid amides.

In other embodiments, the oleophobic agent may comprise a fluoropolymer, such as flurinated acrylates, fluorinated urethanes, fluorinated latex and nitrile rubbers, or tetrafluoroethylene polymer particles, and the like. The composition may contain a single oleophobic agent or may contain a combination of any of the above described oleophobic agents. Other oleophobic agents can be functionalized or non functionalized polypropylene waxes, polyethylene waxes and UHMWPE particles of spherical or non spherical shapes. These particles lead to increases in surface area or reduction in contact area for oil droplets. This reduced contact area keeps surfaces clean from oil and other foreign chemicals. UHMWPE drastically increase surface roughness of molded elastomers and improve wear resistance.

In general, the oleophobic agent is present in the composition in an amount from about 0.05% to about 55% by weight. In one embodiment, one or more oleophobic agents may be present in an amount from about 0.5% to about 20% by weight, such as from about 0.5% to about 5% by weight.

In addition to an oleophobic agent, other additives that may increase oil resistance include a crosslinking agent and/or an antiplasticizer. An antiplasticizer is a material added to the composition that increases the stiffness and possibly the tensile strength of the composition. Antiplasticization can occur by adding small amounts of a plasticizer. When adding small amounts of a plasticizer that increases stiffness, the plasticizer serves as an antiplasticizer.

In one embodiment, the olefin and vinyl acetate copolymer contains vinyl acetate units in an amount from about 3 weight % to about 50 weight %, such as from about 3 weight % to about 30 weight %, such as from about 3 weight % to about 20 weight %. The weight ratio between the thermoplastic polyester elastomer and the olefin and vinyl acetate copolymer can be from about 10:90 to about 90:10, such as from about 20:80 to about 80:20. In one embodiment, the weight ratio between the two polymers can be from about 25:75 to about 49:51 or from about 75:25 to about 51:49.

In one embodiment, the olefin and vinyl acetate copolymer comprises an ethylene vinyl acetate copolymer. The resulting polymer composition can have a melt flow rate at 190° C. and at 2.16 kg of greater than about 0.1 g/10 mins, such as greater than about 1 g/10 mins, such as greater than about 2 g/10 mins. but less than about 25 g/10 mins, such as less than about 20 g/10 mins, such as less than about 15 g/10 mins., such as less than about 10 g/10 mins.

The thermoplastic elastomer may comprise a thermoplastic polyester elastomer, such as a multi-block copolyester elastomer. The thermoplastic polyester elastomer may contain soft segments and hard segments. The hard segments may comprise ester units, while the soft segments may comprise an aliphatic polyester or a polyether glycol. In one embodiment, the thermoplastic polyester elastomer has the following formula: $-[4GT]x[BT]y$, wherein 4G is 1,4-butane diol, B is poly(tetramethylene ether glycol) and T is terephthalate, and wherein x is about 0.6 to about 0.99 and y is about 0.01 to about 0.40.

The polymer composition may comprise an antioxidant. The antioxidant may comprise a sterically hindered phenol. The polymer composition may also comprise a light stabilizer. The light stabilizer may comprise a sterically hindered amine. The polymer composition may also comprise a UV absorber. The UV absorber may comprise a benzotriazole or benzophenone.

In another embodiment, the present disclosure is directed to a polymer composition and to molded parts made from the polymer composition in which the molded articles have a metallic finish. The polymer composition may contain a thermoplastic elastomer blended and/or compounded with a second polymer, such as an olefin and vinyl acetate copolymer. In one embodiment, for instance, the polymer composition may contain a thermoplastic polyester elastomer combined with an ethylene vinyl acetate copolymer. In addition, the polymer composition may contain metallic particles in an amount sufficient for molded articles made from the composition to have a metallic appearance. For instance, the composition may contain a metallic pigment. The metallic pigment may comprise, for instance, an aluminum pigment that contains elemental aluminum, mica, or a mixture thereof. The aluminum can be present in any suitable form. For example, the aluminum pigment may have a rod-like shape, a circular shape, a granular shape, or a spherical shape. In one embodiment, the aluminum particles have a plate-like shape and may comprise, for instance, aluminum flakes. In this regard, the aluminum particles can have an aspect ratio of greater than about 4 to 1, such as greater than about 8 to 1, such as from about 10 to 1 to about 50 to 1.

The amount of the metallic pigment incorporated into the polymer composition can vary based on numerous factors. In one embodiment, the metallic pigment can be present in the polymer composition in an amount from about 0.5% to about 12% by weight.

Molded articles made from the above polymer composition may exhibit a gloss of greater than about 30 gloss units, such as greater than about 35 gloss units, such as greater than about 40 gloss units, such as greater than about 45 gloss units, when measured at a 60° angle using a gloss meter. Any suitable gloss meter may be used such as those available from BYK-Gardner or from the Gretag-Macbeth Corporation.

The polymer composition of the present disclosure can be used to produce numerous articles. In one embodiment, the polymer composition may comprise a coating on a wire or may be used as a component in an electrical device. Molded articles that can be formed from the polymer composition include a casing for an electronic device such as a mobile telephone or a handheld computer, handles and grips for all different types of products including consumer appliances, or an automotive part such as a part placed on the interior of a vehicle. The polymer composition of the present disclosure can also be used to produce packaging.

Other features and aspects of the present disclosure are discussed in greater detail below.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

Figure 1:
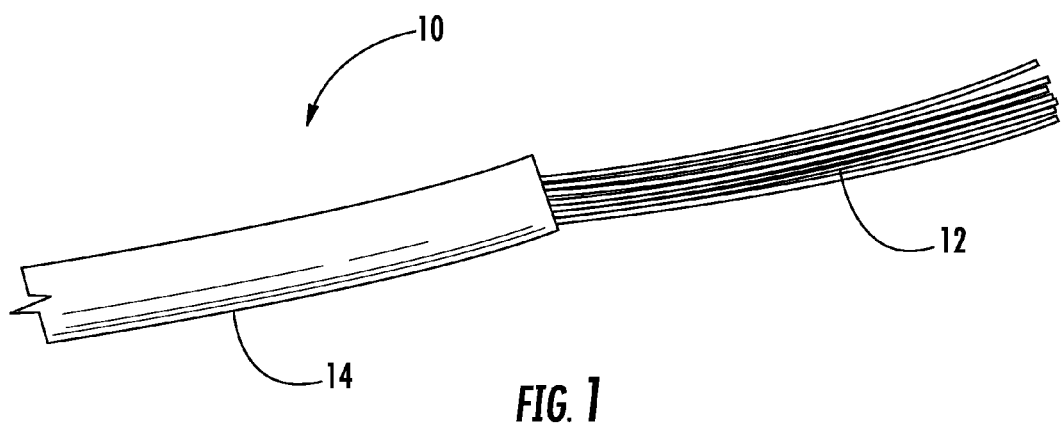
FIG. 1 is a perspective view of one embodiment of a wire or cable made in accordance with the present disclosure.

Repeat use of reference characters in the present specification and drawings is intended to represent the same or analogous features or elements of the present invention.

DETAILED DESCRIPTION

It is to be understood by one of ordinary skill in the art that the present discussion is a description of exemplary embodiments only, and is not intended as limiting the broader aspects of the present disclosure.

In general, the present disclosure is directed to oil resistant polymer compositions that contain a thermoplastic elastomer combined with a second polymer, such as an olefin and vinyl acetate copolymer. In accordance with the present disclosure, the composition further contains an oleophobic agent. Polymer compositions made according to the present disclosure are not only oil resistant but are also flexible and can have elastic properties. The polymer compositions of the present disclosure can be formulated so as to have the physical properties of a thermoplastic elastomer while having improved and controlled flow properties.

In general, the polymer composition of the present disclosure contains a thermoplastic elastomer blended with a second polymer, such as an olefin and vinyl acetate copolymer, and an oleophobic agent. Combining the second polymer and the oleophobic agent with the elastomer results in a composition having oil resistant properties.

Elastomers, particularly copolyester elastomers, are known to degrade when contacted with oils. For instance, copolyester elastomers contain soft ether segments that, due to their polymer structure, allow for the penetration of large oil molecules. Once an elastomer absorbs oils, the elastomer may discolor and yellow. In addition, the absorbed oil may lead to the degradation of mechanical properties.

Consequently, oil resistance is particularly needed when producing molded articles and coatings made from a thermoplastic elastomer that are used in environments where exposure to oil is anticipated. For instance, human skin may contain natural sebum or artificial sebum, which is a mixture of oils including olive oil, squalene, palm oil, triglyceride oils, and the like. Consequently, coatings, articles, and other molded products made from elastomers that are intended to be contacted by humans are susceptible to discoloration and degradation over time due to the repeated human contact.

The composition of the present disclosure, however, is capable of rendering a thermoplastic elastomer, particularly a polyester elastomer, oil resistant. Of particular advantage, the elastomer has oil resistant properties while still retaining other desired physical properties. For instance, the composition can retain desired flexural modulus and other physical properties within narrow tolerance limits and can display those temperatures over a relatively wide temperature range.

Polymer compositions made in accordance with the present disclosure can be used in numerous and diverse applications. The polymer composition, for instance, can be used as a coating on a surface such as for refrigerators, garage doors, window panels, ceiling grids, and the like. Alternatively, various articles and products can be produced from the polymer composition. For example, since the polymer composition is thermoplastic in nature, the polymer composition can be molded into any suitable shape using, for instance, injection molding, blow molding, or extrusion. The polymer composition may be molded using over-molding or a soft-touch 2-shot over-molding process. In addition, the polymer composition and article produced therefrom may provide increased weldability for joint and heat sealing. Freestanding articles can be produced from the polymer composition or the polymer composition can form a coating or component on or in a product.

In one embodiment, for instance, the polymer composition may be used to produce coatings for wires. As used herein, a wire is referred to as any multi-layer article that has a linear configuration. The term wire, for instance, includes cables and all flexible threads or rods that include a core covered by a coating.

Referring to FIG. 1, for instance, one embodiment of a wire 10 in accordance with the present disclosure is shown. As illustrated, the wire 10 includes a core 12 that can be made from one or more metal elements. In the embodiment illustrated, for instance, the core 12 is made from multiple threads or filaments. The core 12 is surrounded by a coating or sheath 14 made in accordance with the present disclosure. In particular, the flame resistant, polymer composition containing the thermoplastic elastomer in combination with the olefin and vinyl acetate copolymer can be used to produce the sheath 14 in forming the wire 10.

Figure 2:
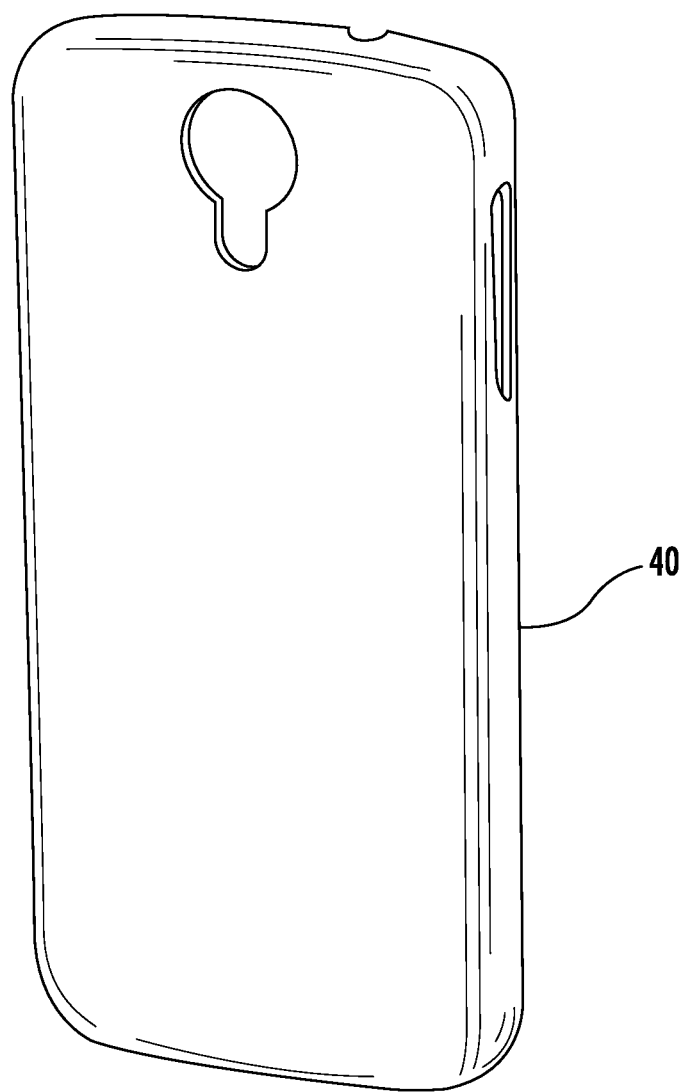
FIG. 2 is a perspective view of a cover for a mobile phone made in accordance with the present disclosure.

In an alternative embodiment, the polymer composition of the present disclosure can be used to produce protective covers for electronics. For instance, FIG. 2 illustrates a protective cover 40 for a mobile phone.

Figure 3:
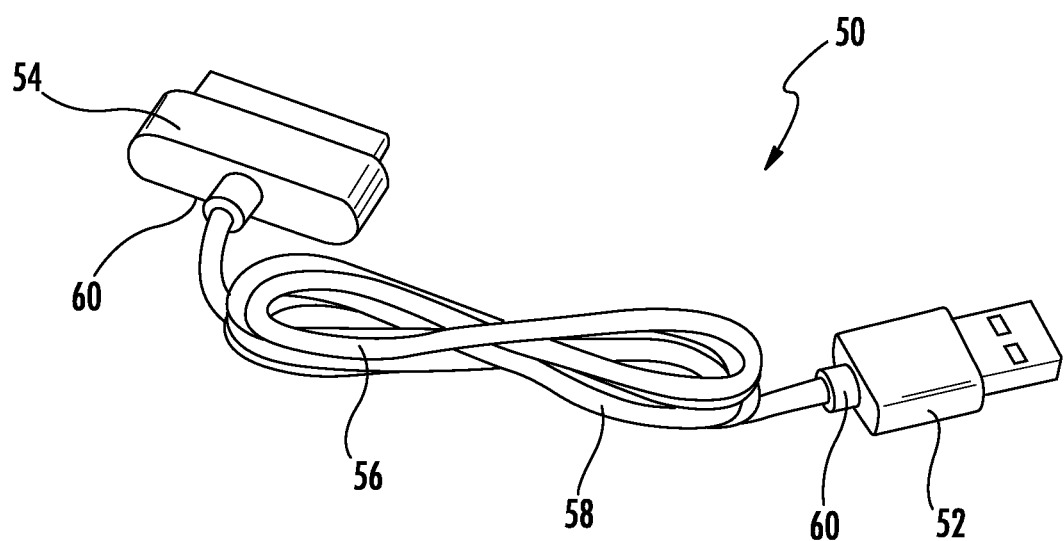
FIG. 3 is a perspective view of a cable connector that may have a sleeve made from the composition of the present disclosure which prevent or inhibit kinks in the sleeve.

In still another embodiment, the polymer composition of the present disclosure can be used to produce a connector 50 as shown in FIG. 3. The connector 50 includes a first connector 52, such as a USB port, and a second connector 54 that are in electrical communication with each other by a cable 56. In accordance with the present disclosure, the polymer composition may be used to produce the sheath 58 that is part of the cable 56. In addition, the polymer composition may be used to produce a transition sleeve 60. The transition sleeve 60 is positioned around the cable 56 before entering each connector 52 and 54. The polymer composition of the present disclosure is particularly well suited for producing the sleeves 60 because sleeves made from the polymer composition are very resistant to kinking.

Figure 4:
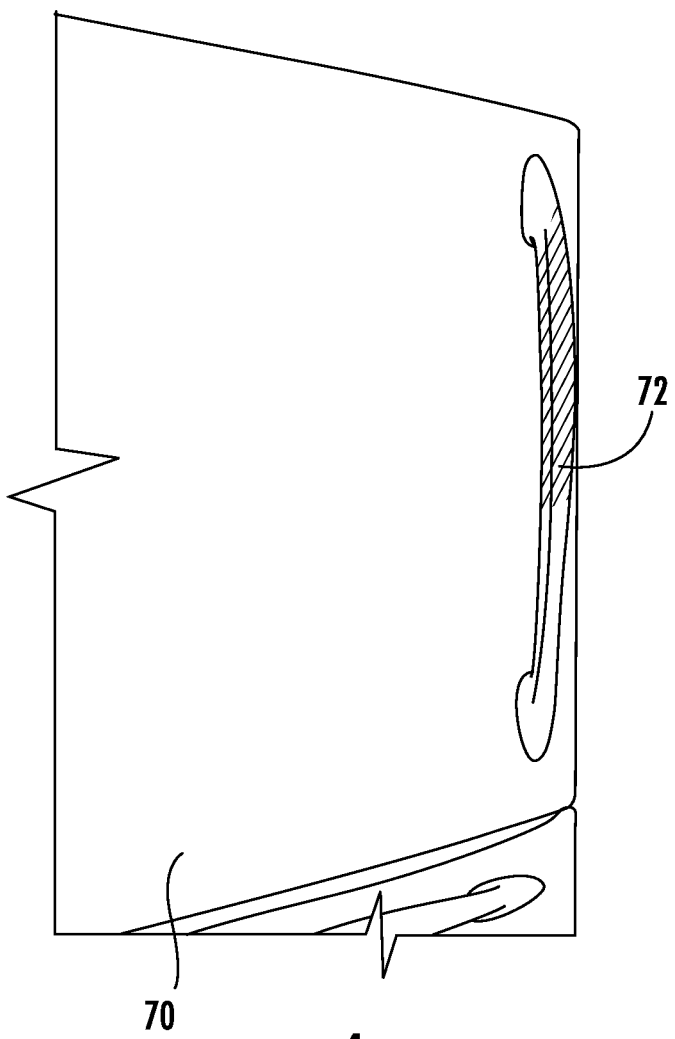
FIG. 4 is a perspective view of one embodiment of a handle or grip made in accordance with the present disclosure.

In another embodiment, the polymer composition may be used to produce a handle or grip. For example, referring to FIG. 4, a refrigerator 70 is illustrated. The refrigerator 70 includes a handle 72. The entire handle or a portion of the handle 72 can be made from the polymer composition of the present disclosure. In one embodiment, for instance, the handle 72 may include a coating made from the polymer composition.

Figure 5:
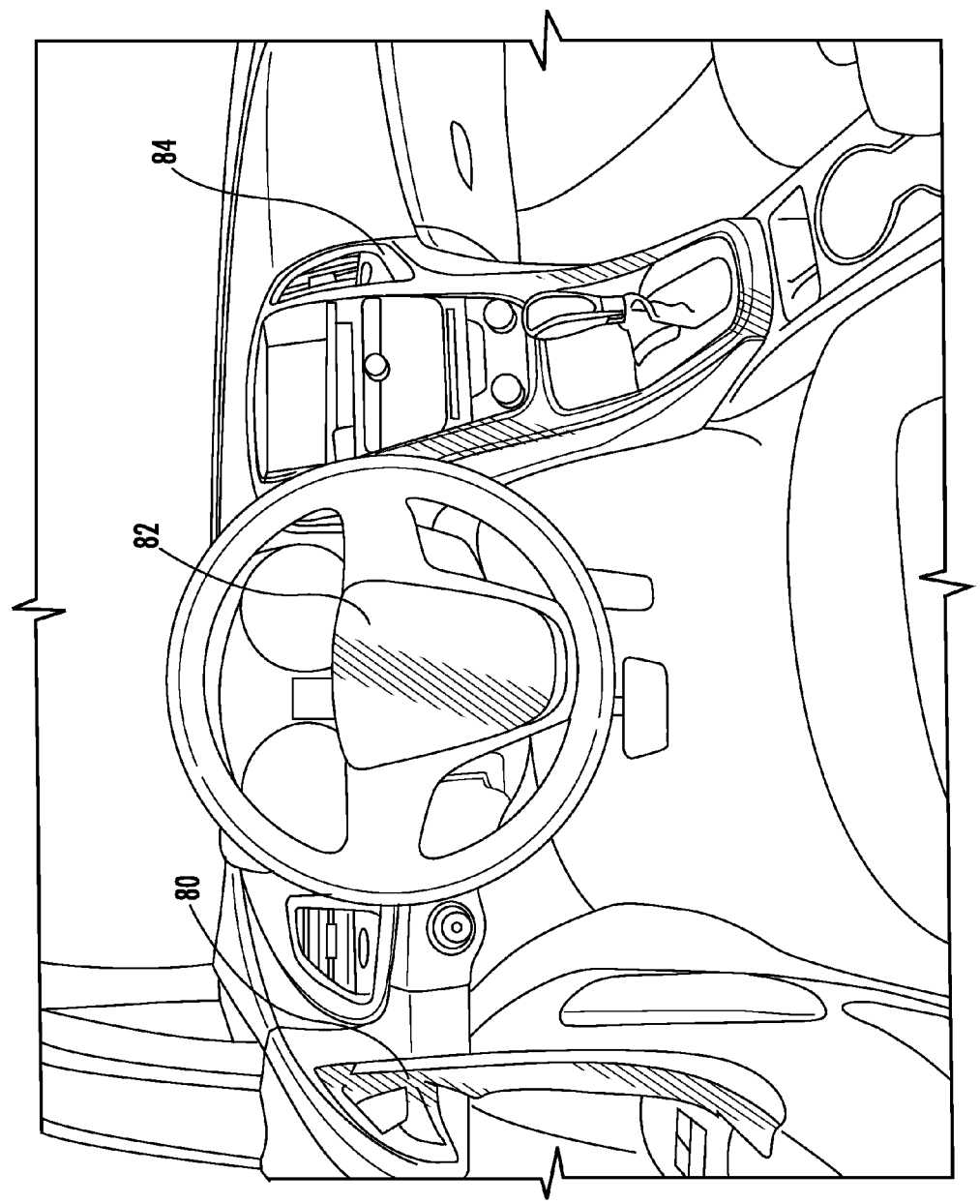
FIG. 5 is a perspective view of one embodiment of automotive parts made in accordance with the present disclosure.

In still another embodiment, the polymer composition can be used to mold and produce automotive parts. The automotive parts may be on the exterior of the vehicle or, alternatively, on the interior of the vehicle. Referring to FIG. 5, for instance, an automotive interior is illustrated. The polymer composition may be used to produce automotive part 80, which comprises at least a portion of an interior door handle. The polymer composition may also be used to produce a part on the steering column such as automotive part 82. In general, the polymer composition can be used to mold any suitable trim piece or bezel, such as trim piece 84.

Figure 6:
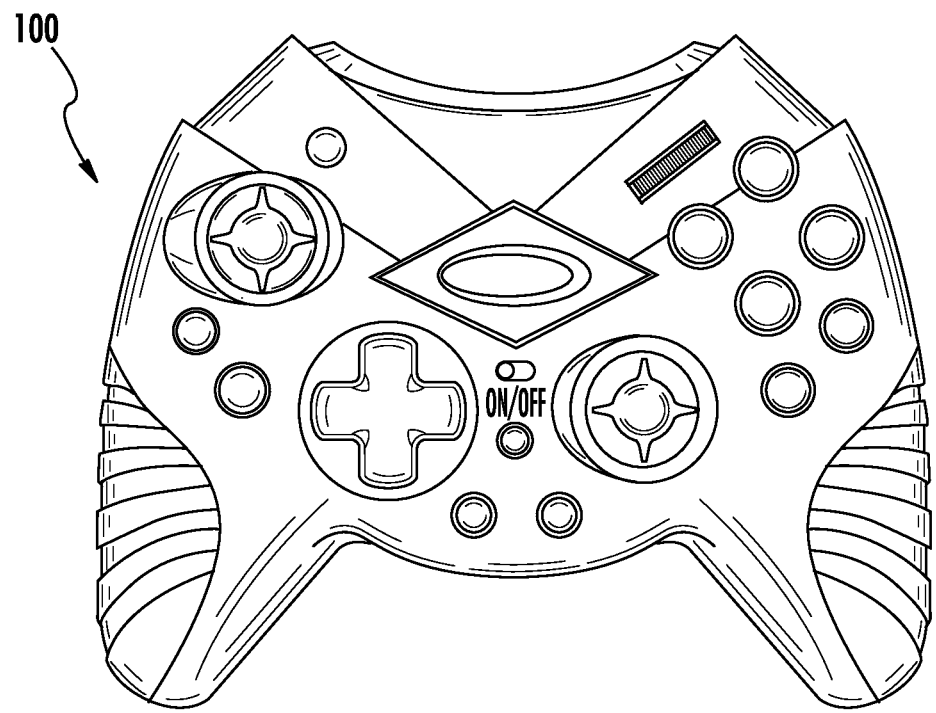
FIGS. 6 and 7 are perspective views of gaming consoles that may be made in accordance with the present disclosure.

In yet another embodiment, the polymer composition of the present disclosure can be incorporated into various handheld electronic devices to provide not only protection to the device but also to provide a soft and cushion-like feel. For instance, in FIGS. 6 and 7, handheld gaming consoles are illustrated. In FIG. 6, a gaming console 100 is shown in which the entire exterior or portions of the exterior can include grips made in accordance with the present disclosure.

Figure 7:
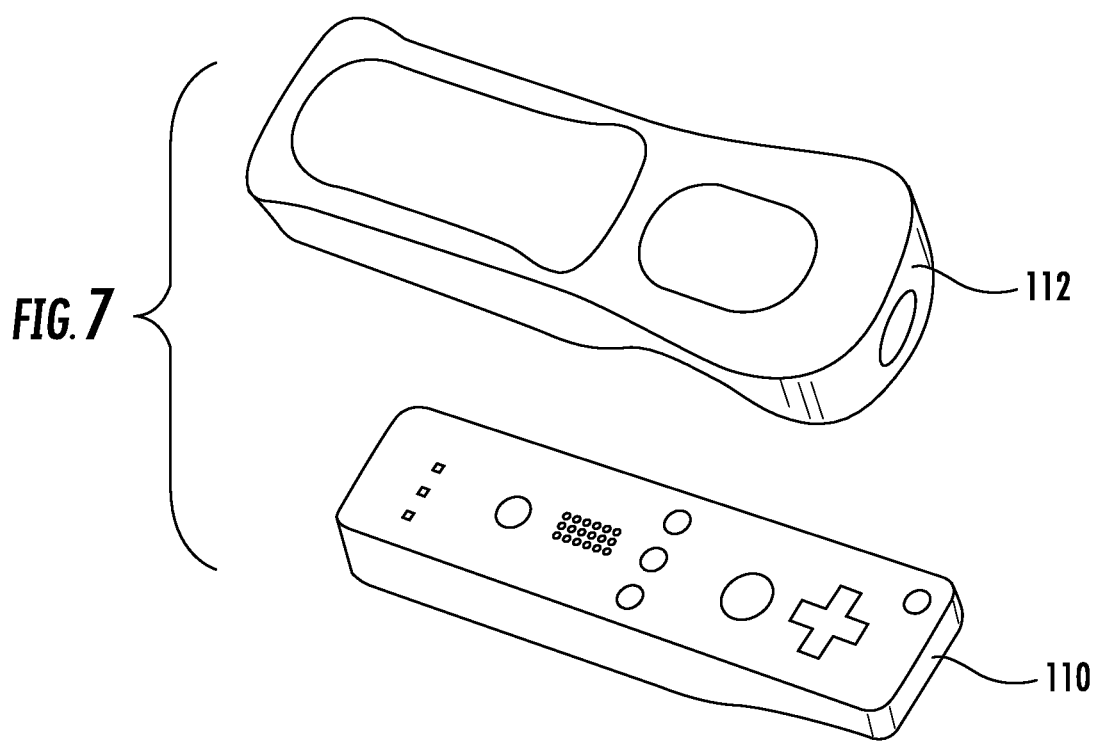

In FIG. 7, a handheld gaming console 110 is illustrated that can be surrounded by a protective cover 112. The protective cover 112 can be made from the composition of the present disclosure.

Figure 8:
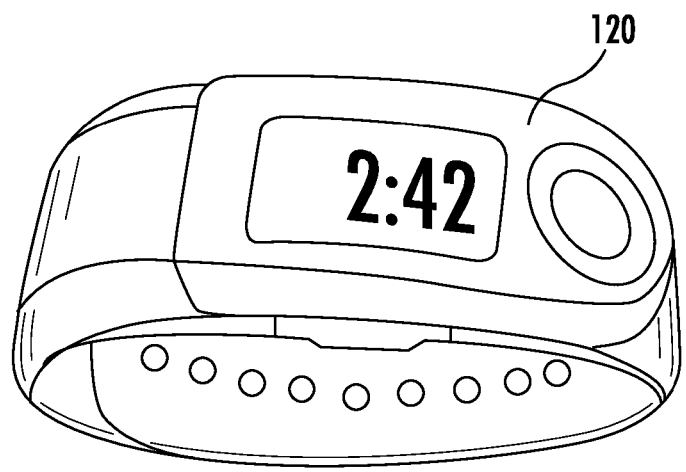
FIG. 8 is a perspective view of a smart wristband that may be made in accordance with the present disclosure.

In another embodiment, the composition of the present disclosure may be used to produce a wristband, such as a smart wristband 120 as shown in FIG. 8. The wristband 120 may function as a clock and/or may have various other functions including health monitoring functions.

Figure 9:
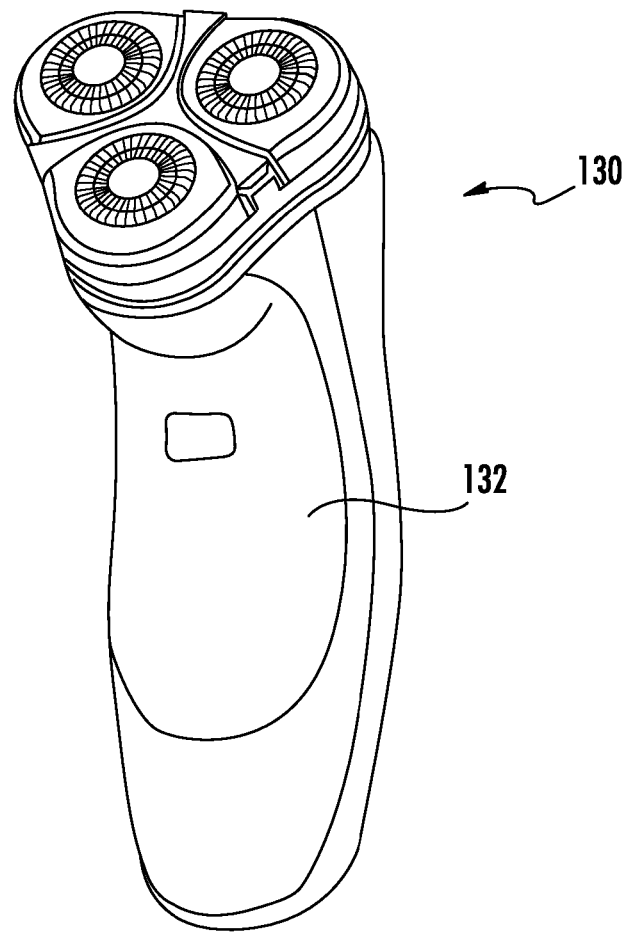
FIG. 9 is a perspective view of a razor including a handle made in accordance with the present disclosure.

In still another embodiment, the composition of the present disclosure may be used to form a grip 132 on an electric razor 130 as shown in FIG. 9.

In addition to the above, the polymer composition of the present disclosure can be used to produce a variety of different types of articles. The polymer composition can be used to produce films, molded articles, fibers, and the like.

The polymer composition of the present disclosure may have other applications as well. For instance, the polymer composition can be used to produce bags, stretch-hooder films, specialty tie-layers, tubing, and the like. The polymer composition can be used to produce dampers and cushions, stoppers, caps and plugs, seals, grommets, gaskets, washers, gears, pulley and pulley components, valves, diaphragms, constant velocity joint boots, and the like. The polymer composition can be used to produce toys and toy component, ergonomic soft grips, device handles such as protective covers for electronics such as mobile phones and tablets, covers for cosmetic products such as compacts, and sporting goods and equipment. The polymer composition can be used to produce packaging materials such as those mentioned above as well as barrier films, household goods such as containers, furniture parts, and the like. The polymer composition can also be incorporated into moderate performance commodity articles, and the like.

In addition, the properties of the polymer composition and molded part or article produced therefrom may allow for secondary processing such as by joining two molded parts. The secondary processing techniques may include heat sealing, heat lamination, vibrating welding, ultrasonic welding, adhesive welding or adhesive gluing, or radio frequency welding. For instance, two injection molded parts may be welded together by secondary processing such as by heat sealing or radio frequency welding.

As described above, the polymer composition of the present disclosure generally contains a thermoplastic elastomer combined with a second polymer in addition to at least one oleophobic agent. Various different types of oleophobic agents may be incorporated into the polymer composition in accordance with the present disclosure. The one or more oleophobic agents have been found to substantially increase the oil resistance of the polymer matrix. Oleophobic agents that may be used in accordance with the present disclosure include ultrahigh molecular weight silicones, fatty acid amide waxes, bis amides, polyamides including polyamide terpolymers, silicone fluids, fluoropolymers, silica including functionalized silica, and mixtures thereof.

In one embodiment, the oleophobic agent comprises an ultrahigh molecular weight silicone (UHMW-Si). In general, the UHMW-Si may have an average molecular weight of greater than about 100,000 g/mol, such as greater than about 200,000 g/mol, such as greater than about 300,000 g/mol, such as greater than 500,000 g/mol and less than about 5,000,000 g/mol, such as less than about 3,000,000 g/mol, such as less than about 2,000,000 g/mol, such as less than about 1,000,000 g/mol, such as less than about 500,000 g/mol, such as less than about 300,000 g/mol. Generally, the UHMW-Si may have a kinematic viscosity at 40° C. measured according to DIN 51562 of greater than about 100,000 mm$^2$s$^{-1}$, such as greater than about 200,000 mm$^2$s$^{-1}$, such as greater than about 1,000,000 mm$^2$s$^{-1}$, such as greater than about 5,000,000 mm$^2$s$^{-1}$, such as greater than about 10,000,000 mm$^2$s$^{-1}$, such as greater than about 15,000,000 mm$^2$s$^{-1}$ and less than about 50,000,000 mm$^2$s$^{-1}$, such as less than about 25,000,000 mm$^2$s$^{-1}$, such as less than about 10,000,000 mm$^2$s$^{-1}$, such as less than about 1,000,000 mm$^2$s$^{-1}$, such as less than about 500,000 mm$^2$s$^{-1}$, such as less than about 200,000 mm$^2$s$^{-1}$.

The UHMW-Si may comprise a siloxane such as a polysiloxane or polyorganosiloxane. In one embodiment, the UHMW-Si may comprise a dialkylpolysiloxane such as a dimethylsiloxane, an alkylarylsiloxane such as a phenylmethylsilaoxane, or a diarylsiloxane such as a diphenylsiloxane, or a homopolymer thereof such as a polydimethylsiloxane or a polymethylphenylsiloxane, or a copolymer thereof with the above molecular weight and/or kinematic viscosity requirements. The polysiloxane or polyorganosiloxane may also be modified with a substituent such as an epoxy group, a hydroxyl group, a carboxyl group, an amino group or a substituted amino group, an ether group, amide group, ester group, urethane group or a meth(acryloyl) group in the end or main chain of the molecule. The UHMW-Si compounds may be used singly or in combination. Any of the above UHMW-Si compounds may be used with the above molecular weight and/or kinematic viscosity requirements.

The ultrahigh molecular weight silicone may be added to the composition alone or in combination with a carrier as a masterbatch. The carrier, for instance, may comprise any thermoplastic polymer that is compatible with the thermoplastic elastomer and the second thermoplastic polymer. For instance, in one embodiment, the carrier may comprise a polyester polymer or EVA and may form a master batch that is incorporated into the polymer composition. The master batch may comprise from about 10% to about 50% by weight, such as from about 35% to about 45% by weight of the ultrahigh molecular weight silicone.

In an alternative embodiment, the oleophobic agent may comprise an amide, such as a fatty acid amide, a bis amide, or a polyamide. The fatty acid amide may comprise a primary amine, a secondary amine, or a tertiary amine. For instance, in one embodiment, the fatty acid amide may have the following formula:

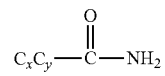

wherein X=the range of 6 to 26 and Y=the range of 13 to 53.

The carbon chain of the fatty acid can be of either an alkane, alkene, or alkyne structure.

In other embodiments, however, the fatty acid amide may include one or more secondary amine groups and one or more fatty acid groups.

Amide waxes may be employed that are formed by reaction of a fatty acid with a monoamine or diamine (e.g., ethylenediamine) having 2 to 18, especially 2 to 8, carbon atoms. For example, ethylenebisamide wax, which is formed by the amidization reaction of ethylene diamine and a fatty acid, may be employed. The fatty acid may be in the range from $C_{12}$ to $C_{30}$, such as from stearic acid ($C_{18}$ fatty acid) to form ethylenebisstearamide wax. Other ethylenebisamides include the bisamides formed from lauric acid, palmitic acid, oleic acid, linoleic acid, linolenic acid, oleostearic acid, myristic acid and undecalinic acid. Still other suitable amide waxes are N-(2-hydroxyethyl)12-hydroxystearamide and N,N'-(ethylene bis)12-hydroxystearamide. Other suitable fatty acid amides include erucamide wax and bisdodecanamide. The above fatty acid amides may be used alone or in combination. For example a commercially available blend of fatty acid amides includes EBO 44%, ER 33%, oleyl palmitamide (vegetable source secondary amide) 22% which can be obtained as a commercially available blend. In addition, a fatty acid amide may be used in combination with an ultrahigh molecular weight silicone.

Alternatively, the oleophobic agent may comprise a silicone oil. When silicone oil is present in the composition, the silicone oil may have an average molecular weight of at least about 5,000 g/mol, such as at least about 20,000 g/mol, such as at least about 50,000 g/mol and generally less than about 100,000 g/mol, such as less than about 75,000 g/mol, such as less than about 50,000 g/mol. The silicone oil may have a kinematic viscosity at 40° C. measured according to DIN 51562 of greater than about 100 mm$^2$s$^{-1}$, such as greater than about 5,000 mm$^2$s$^{-1}$, such as greater than about 15,000 mm$^2$s$^{-1}$ and generally less than about 100,000 mm$^2$s$^{-1}$, such as less than about 50,000 mm$^2$s$^{-1}$, such as less than about 25,000 mm²s⁻¹, such as less than about 15,000 mm²s⁻¹. The silicone oil may comprise a liquid polysiloxane such as a polydimethylsiloxane (PDMS) at a room temperature of 25° C. with the above molecular weight and/or kinematic viscosity specifications.

In still another embodiment, the oleophobic agent may comprise a fluoropolymer. For instance, the fluoropolymer may comprise polytetrafluoroethylene (PTFE) particles. The PTFE particles may be in the form of a powder or in the form of a fiber.

In still another embodiment, the oleophobic agent may comprise metal oxide particles, such as silica. The silica may comprise precipitated silica or fumed silica. In one embodiment, a functionalized silica may be used. A functionalized silica refers to a silica that has been bonded or complexed with a hydrophobic agent. For instance, silica can be associated with silane groups. The silane groups may comprise an organosilane such as PDMS.

The one or more oleophobic agents may be present in the polymer composition in an amount from about 0.05% to about 55% by weight. For instance, one or more oleophobic agents may be present in the composition in an amount from about 0.5% to about 20% by weight, such as in an amount from about 0.5% to about 5% by weight. When multiple oleophobic agents are contained in the composition, each oleophobic agent may be present in an amount from about 0.5% to about 10% by weight, such as in an amount from about 0.5% to about 5% by weight.

The above components in accordance with the present disclosure are blended with a thermoplastic elastomer and a second polymer. The second polymer may comprise a vinyl polymer, an olefin, a carbonate, a polyester, or mixtures thereof. The second polymer may comprise a copolymer having an ethylene backbone. The copolymer may contain ethylene in combination with acrylate units. For instance, the copolymer may contain methylacrylate units, ethylacrylate units, glycidyl acrylate units, butylacrylate units, maleic anhydride acrylate units, itaconic anhydride acrylate units, and the like. In one embodiment, the second polymer comprises an olefin and vinyl acetate copolymer, such as an ethylene vinyl acetate copolymer. In general, the weight ratio between the thermoplastic elastomer and the olefin and vinyl acetate copolymer can range from about 10:90 to about 90:10, such as from about 20:80 to about 80:20, such as from about 25:75 to about 75:25, such as from about 35:65 to about 65:35. In one embodiment, the thermoplastic elastomer is present in the polymer composition in an amount greater than about 5 wt. % or in an amount less than about 5 wt. % in comparison to the amount of olefin and vinyl acetate copolymer present. In general, formulations of containing an ethylene vinyl acetate copolymer with elastomers and polymers are disclosed in U.S. Pat. No. 4,085,082 to Lamb et al., U.S. Pat. No. 4,243,576 to Fischer et al., and U.S. Pat. No. 4,403,007 to Coughlin, and US Patent Application 2014/079,898 by Kaushik et. al. which are incorporated herein by reference.

In one embodiment, the thermoplastic elastomer may comprise a thermoplastic polyester elastomer. For example, the polymer composition may contain a copolyester elastomer such as a segmented thermoplastic copolyester. The thermoplastic polyester elastomer, for example, may comprise a multi-block copolymer. Useful segmented thermoplastic copolyester elastomers include a multiplicity of recurring long chain ester units and short chain ester units joined head to tail through ester linkages. The long chain units can be represented by the formula

and the short chain units can be represented by the formula

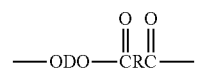

where G is a divalent radical remaining after the removal of the terminal hydroxyl groups from a long chain polymeric glycol having a number average molecular weight in the range from about 600 to 6,000 and a melting point below about 55° C., R is a hydrocarbon radical remaining after removal of the carboxyl groups from dicarboxylic acid having a molecular weight less than about 300, and D is a divalent radical remaining after removal of hydroxyl groups from low molecular weight diols having a molecular weight less than about 250.

The short chain ester units in the copolyetherester provide about 15 to 95% of the weight of the copolyetherester, and about 50 to 100% of the short chain ester units in the copolyetherester are identical.

The term "long chain ester units" refers to the reaction product of a long chain glycol with a dicarboxylic acid. The long chain glycols are polymeric glycols having terminal (or nearly terminal as possible) hydroxy groups, a molecular weight above about 600, such as from about 600-6000, a melting point less than about 55° C. and a carbon to oxygen ratio about 2.0 or greater. The long chain glycols are generally poly(alkylene oxide) glycols or glycol esters of poly(alkylene oxide)dicarboxylic acids. Any substituent groups can be present which do not interfere with polymerization of the compound with glycol(s) or dicarboxylic acid(s), as the case may be. The hydroxy functional groups of the long chain glycols which react to form the copolyesters can be terminal groups to the extent possible. The terminal hydroxy groups can be placed on end capping glycol units different from the chain, i.e., ethylene oxide end groups on poly(propylene oxide glycol).

The term "short chain ester units" refers to low molecular weight compounds or polymer chain units having molecular weights less than about 550. They are made by reacting a low molecular weight diol (below about 250) with a dicarboxylic acid.

The dicarboxylic acids may include the condensation polymerization equivalents of dicarboxylic acids, that is, their esters or ester-forming derivatives such as acid chlorides and anhydrides, or other derivatives which behave substantially like dicarboxylic acids in a polymerization reaction with a glycol.

The dicarboxylic acid monomers for the elastomer have a molecular weight less than about 300. They can be aromatic, aliphatic or cycloaliphatic. The dicarboxylic acids can contain any substituent groups or combination thereof which do not interfere with the polymerization reaction. Representative dicarboxylic acids include terephthalic and isophthalic acids, bibenzoic acid, substituted dicarboxy compounds with benzene nuclei such as bis(p-carboxyphenyl) methane, p-oxy-(p-carboxyphenyl) benzoic acid, ethylene-bis(p-oxybenzoic acid), 1,5-naphthalene dicarboxylic acid, 2,6-naphthalene dicarboxylic acid, 2,7-naphthalene dicarboxylic acid, phenanthralenedicarboxylic acid, anthralenedicarboxylic acid, 4,4'-sulfonyl dibenzoic acid, etc. and $C_1$-$C_{10}$ alkyl and other ring substitution derivatives thereof such as halo, alkoxy or aryl derivatives. Hydroxy acids such as p(β-hydroxyethoxy)benzoic acid can also be used providing an aromatic dicarboxylic acid is also present.

Representative aliphatic and cycloaliphatic acids are sebacic acid, 1,3- or 1,4-cyclohexane dicarboxylic acid, adipic acid, glutaric acid, succinic acid, carbonic acid, oxalic acid, itaconic acid, azelaic acid, diethylmalonic acid, fumaric acid, citraconic acid, allylmalonate acid, 4-cyclohexene-1,2-dicarboxylate acid, pimelic acid, suberic acid, 2,5-diethyladipic acid, 2-ethylsuberic acid, 2,2,3,3-tetramethylsuccinic acid, cyclopentanedicarboxylic acid, decahydro-1,5- (or 2,6-) naphthylenedicarboxylic acid, 4,4'-bicyclohexyl dicarboxylic acid, 4,4'-methylenebis(cyclohexyl carboxylic acid), 3,4-furan dicarboxylate, and 1,1-cyclobutane dicarboxylate.

The dicarboxylic acid may have a molecular weight less than about 300. In one embodiment, phenylene dicarboxylic acids are used such as terephthalic and isophthalic acid.

Included among the low molecular weight (less than about 250) diols which react to form short chain ester units of the copolyesters are acyclic, alicyclic and aromatic dihydroxy compounds. Included are diols with 2-15 carbon atoms such as ethylene, propylene, isobutylene, tetramethylene, pentamethylene, 2,2-dimethyltrimethylene, hexamethylene and decamethylene glycols, dihydroxy cyclohexane, cyclohexane dimethanol, resorcinol, hydroquinone, 1,5-dihydroxy naphthalene, etc. Also included are aliphatic diols containing 2-8 carbon atoms. Included among the bis-phenols which can be used are bis(p-hydroxy) diphenyl, bis(p-hydroxyphenyl) methane, and bis(p-hydroxyphenyl) propane. Equivalent ester-forming derivatives of diols are also useful (e.g., ethylene oxide or ethylene carbonate can be used in place of ethylene glycol). Low molecular weight diols also include such equivalent ester-forming derivatives.

Long chain glycols which can be used in preparing the polymers include the poly(alkylene oxide) glycols such as polyethylene glycol, poly(1,2- and 1,3-propylene oxide) glycol, poly(tetramethylene oxide) glycol, poly(pentamethylene oxide) glycol, poly(hexamethylene oxide) glycol, poly(heptamethylene oxide) glycol, poly(octamethylene oxide) glycol, poly(nonamethylene oxide) glycol and poly(1,2-butylene oxide) glycol; random and block copolymers of ethylene oxide and 1,2-propylene oxide and poly-formals prepared by reacting formaldehyde with glycols, such as pentamethylene glycol, or mixtures of glycols, such as a mixture of tetramethylene and pentamethylene glycols.

In addition, the dicarboxymethyl acids of poly(alkylene oxides) such as the one derived from polytetramethylene oxide HOOCCH$_2$(OCH$_2$CH$_2$CH$_2$CH$_2$)$_x$OCH$_2$COOH IV can be used to form long chain glycols in situ. Polythioether glycols and polyester glycols also provide useful products. In using polyester glycols, care must generally be exercised to control a tendency to interchange during melt polymerization, but certain sterically hindered polyesters, e.g., poly(2,2-dimethyl-1,3-propylene adipate), poly(2,2-dimethyl-1,3-propylene/2-methyl-2-ethyl-1,3-propylene 2,5-dimethylterephthalate), poly(2,2-dimethyl-1,3-propylene/2,2-diethyl-1,3-propylene, 1,4 cyclohexanedicarboxylate) and poly(1,2-cyclohexylenedimethylene/2,2-dimethyl-1,3-propylene 1,4-cyclohexanedicarboxylate) can be utilized under normal reaction conditions and other more reactive polyester glycols can be used if a short residence time is employed. Either polybutadiene or polyisoprene glycols, copolymers of these and saturated hydrogenation products of these materials are also satisfactory long chain polymeric glycols. In addition, the glycol esters of dicarboxylic acids formed by oxidation of polyisobutylenediene copolymers are useful raw materials.

Although the long chain dicarboxylic acids (IV) above can be added to the polymerization reaction mixture as acids, they react with the low molecular weight diols(s) present, these always being in excess, to form the corresponding poly(alkylene oxide) ester glycols which then polymerize to form the G units in the polymer chain, these particular G units having the structure

when only one low molecular weight diol (corresponding to D) is employed. When more than one diol is used, there can be a different diol cap at each end of the polymer chain units. Such dicarboxylic acids may also react with long chain glycols if they are present, in which case a material is obtained having a formula the same as V above except the Ds are replaced with polymeric residues of the long chain glycols. The extent to which this reaction occurs is quite small, however, since the low molecular weight diol is present in considerable molar excess.

In place of a single low molecular weight diol, a mixture of such diols can be used. In place of a single long chain glycol or equivalent, a mixture of such compounds can be utilized, and in place of a single low molecular weight dicarboxylic acid or its equivalent, a mixture of two or more can be used in preparing the thermoplastic copolyester elastomers which can be employed in the compositions of this invention. Thus, the letter "G" in Formula II above can represent the residue of a single long chain glycol or the residue of several different glycols, the letter D in Formula III can represent the residue of one or several low molecular weight diols and the letter R in Formulas II and III can represent the residue of one or several dicarboxylic acids. When an aliphatic acid is used which contains a mixture of geometric isomers, such as the cis-trans isomers of cyclohexane dicarboxylic acid, the different isomers should be considered as different compounds forming different short chain ester units with the same diol in the copolyesters. The copolyester elastomer can be made by conventional ester interchange reaction.

As described above, the hardness of the thermoplastic elastomer can be varied by varying the amount of hard segments and soft segments. For instance, the thermoplastic elastomer can generally have a hardness of greater than about 10 Shore D, such as greater than about 15 Shore D, such as greater than about 20 Shore D. The hardness is generally less than about 70 Shore D, such as less than about 60 Shore D, such as less than about 55 Shore D, such as less than about 50 Shore D. In one embodiment, a thermoplastic polyester elastomer is used that has a Shore D hardness of from about 20 to about 45. In an alternative embodiment, a thermoplastic polyester elastomer is used that has a Shore D hardness of from about 22 to about 35. In an alternative embodiment, a thermoplastic elastomer may be used that has a Shore D hardness of from about 35 to about 47. And in another alternative embodiment, a thermoplastic elastomer may be used that has a Shore D hardness of from about 50 to about 70.

Copolyether esters with alternating, random-length sequences of either long chain or short chain oxyalkylene glycols can contain repeating high melting blocks that are capable of crystallization and substantially amorphous blocks with a relatively low glass transition temperature. In one embodiment, the hard segments can be composed of tetramethylene terephthalate units and the soft segments may be derived from aliphatic polyether and polyester glycols. Of particular advantage, the above materials resist deformation at surface temperatures because of the presence of a network of microcrystallites formed by partial crystallization of the hard segments. The ratio of hard to soft segments determines the characteristics of the material. Thus, another advantage to thermoplastic polyester elastomers is that soft elastomers and hard elastoplastics can be produced by changing the ratio of the hard and soft segments.

In one particular embodiment, the polyester thermoplastic elastomer has the following formula: $-[4GT]_x[BT]_y$, wherein 4G is butylene glycol, such as 1,4-butane diol, B is poly(tetramethylene ether glycol) and T is terephthalate, and wherein x is from about 0.60 to about 0.99 and y is from about 0.01 to about 0.40.

In general, the thermoplastic elastomer is present in the polymer composition in an amount of at least about 5% by weight, such as at least about 10% by weight, such as at least 15% by weight, such as at least 20% by weight but less than about 75% by weight, such as less than about 65% by weight, such as less than about 55% by weight, such as less than about 45% by weight. In one embodiment, the thermoplastic elastomer is present in the polymer composition in an amount from about 20% to about 35% by weight.

The thermoplastic polyester elastomer may comprise a polyester polymer such as a polyalkylene terephthalate copolymer. The polyalkylene terephthalate copolymer may comprise a polyethylene terephthalate glycol-modified copolymer (PET-G) containing cyclohexane dimethanol or a polyethylene terephthalate glycol-modified copolymer containing neopentyl glycol, or a polyethylene terephthalate glycol-modified copolymer containing 2-methy-1,3-propane diol. In one embodiment, for instance, the polyester used in the polymer composition comprises a glycol-modified polyethylene terephthalate in which the glycol is replaced with cyclohexane dimethanol or with neopentyl glycol. For instance, in one embodiment, at least about 5 mol percent, such as at least about 7 mol percent, such as at least about 10 mol percent, such as at least about 15 mol percent of the ethylene glycol may be modified. In general, the ethylene glycol may be modified by less than about 30 mol percent, such as less than about 25 mol percent, such as less than about 20 mol percent, such as less than about 15 mol percent. In certain embodiments, there may be advantages in using a polyester modified with neopentyl glycol, cyclohexane dimethanol, or with 2-methyl-1,3-propane diol because they may improve stress fracture resistance.

The polyester polymer may comprise a polyalkylene terephthalate copolymer, such as a polyethylene terephthalate acid-modified copolymer (PET-A) containing isophthalic acid or a polyethylene terephthalate acid-modified copolymer containing cyclohexane dicarboxylic acid. The polyester polymer may comprise a polyalkylene terephthalate copolymer, such as a polyethylene terephthalate glycol- and acid-modified copolymer containing cyclohexane dimethanol and isophthalic acid, or other combinations.

The thermoplastic elastomer is generally combined with a vinyl ester copolymer and particularly a vinyl ester of acetic acid copolymer. The copolymer contains vinyl ester monomeric units, such as vinyl acetate, in combination with other monomeric units. For instance, the other monomeric units may comprise an olefin. In one embodiment, for instance, the olefin comprises ethylene.

The production of ethylene vinyl acetate copolymers can occur using various processes and techniques. In one embodiment, vinyl acetate is first produced.

Vinyl acetate can then be polymerized in bulk, in solution, in an emulsion, or in a suspension. In the case of both polymer and monomer transfer, two mechanisms are possible that occur either at the tertiary carbon or at the acetate group. A radical formed at either of the tertiary carbon atom or at the acetate group can then initiate polymerization and form branched structures. In one embodiment, poly(vinyl acetate) is produced in an emulsion form during an emulsion polymerization process.

When producing an olefin and vinyl acetate copolymer, polymerization occurs with vinyl acetate in combination with another monomer, such as an ethylene source. Process conditions can be controlled so as to control the amount of vinyl acetate present in the resulting copolymer.

In this regard, the olefin and vinyl acetate copolymer used in the present disclosure generally contains greater amounts of the olefin in relation to the vinyl acetate. Vinyl acetate, for instance, is generally present in the copolymer in an amount less than about 50 weight %, such as less than about 40 weight %, such as less than about 30 weight %, such as less than about 28 weight %, such as less than about 20 weight %, such as less than about 18 weight %, such as less than about 15 weight %. The vinyl acetate is present in the copolymer generally in an amount greater than about 5 weight %, such as greater than about 7 weight %. Greater amounts of vinyl acetate in the resulting copolymer can, in some embodiments, lead to various disadvantages. For instance, the resulting polymer composition when combined with the thermoplastic elastomer may have an undesirable degree of tackiness and may also present processing problems. On the other hand, greater amounts of vinyl acetate may provide an increased resistance to environmental stress cracking as well as an increase in transparency.

According to the present disclosure, an olefin and vinyl acetate copolymer is combined with a thermoplastic elastomer. In general, as the amount of olefin and vinyl acetate copolymer content is increased, the polymer composition may exhibit an improvement in viscosity and melt strength. In general, an improvement in melt strength and an increase in viscosity may be obtained using a highly branched olefin and vinyl acetate copolymer. On the other hand, in general, an olefin and vinyl acetate copolymer with less branching may reduce the viscosity of the polymer composition.

The polymer composition can have a melt flow rate at 190° C. and at 2.16 kg of greater than about 0.1 g/10 mins., such as greater than about 1 g/10 mins., such as greater than about 2 g/10 mins but less than about 12 g/10 mins, such as less than about 10 g/10 mins., such as less than about 8 g/10 mins., such as less than about 6 g/10 mins.

As described above, the hardness of the polymer composition can be varied by varying the amount thermoplastic elastomer and olefin and vinyl acetate copolymer. For instance, hardness and other properties can be dependent upon the hardness of the thermoplastic elastomer, ratio of the thermoplastic elastomer to the olefin and vinyl acetate copolymer, hardness of the olefin and vinyl acetate copolymer, processing conditions, and presence of stabilizers and additives. For instance, the polymer composition can generally have a hardness of greater than about 10 Shore D, such as greater than about 15 Shore D, such as greater than about 20 Shore D. The hardness is generally less than about 70 Shore D, such as less than about 60 Shore D, such as less than about 55 Shore D, such as less than about 50 Shore D, such as less than about 48 Shore D. In one embodiment, the polymer composition has a Shore D hardness of from about 20 to about 35. In an alternative embodiment, the polymer composition has a Shore D hardness of from about 35 to about 47.

In general, the flexural modulus can vary widely depending upon the elastomer selected. In general, the flexural modulus can be from about 10 MPa to about 1,300 MPa when tested at 23° C., such as from about 10 MPa to about 400 MPa.

In one embodiment, the polymer composition may also contain a crosslinking agent. Crosslinking using tri-functional or multi-functional reactive additives reduces chain mobility and thus reduces the penetration of large oil molecules. Consequently, the presence of a crosslinking agent can further serve to increase oil resistance. Reducing the total free volume by tuning molecular architecture can also reduce the penetration of large solvent molecules in the elastomer matrix. The correlation of hole free volume and solvent ingress behavior is previously described in article "Effect of free volume hole size on fluid ingress of glassy epoxy networks" Polymer 52 (20), 4528-4535 by Jackson et. al.

In one embodiment, the polymer composition may contain a crosslinking agent. The crosslinking agent may also serve as an impact modifier and/or as a reactive compatibilizer. The crosslinking agent may react with one or more components in the composition. For instance, the crosslinking agent may react with at least one polymer such as the thermoplastic elastomer. For instance, in general, crosslinking the thermoplastic elastomer may improve the melt strength and melt flow properties of the composition making the polymer composition more suitable for processing such as for blow molding or extrusion.

In one embodiment, the crosslinking agent may contain epoxy functionalization. The crosslinking agent can be epoxy functional groups grafted on polyethylene or polypropylene backbone or it can be grafted along with acrylate copolymers. Another crosslinking agent can be maleic anhydride grafted polypropylene, polyethylene or polyamide copolymers. It can also consist of ter polymers of ethylene, acrylates, and a third monomer containing either glycidyl or anhydride functionality. For instance, any suitable epoxy resin that can form crosslinks may be used in the polymer composition. In one embodiment, the epoxy resin may be derived from bisphenol-A such as a poly(bisphenol A-co-epichlorohydrin) glycidyl end-capped resin. In one embodiment, the epoxy resin may be a cresol novolac epoxy resin derived from cresolformaldehyde novolac and epichlorohydrin. In general, the epoxy resin may be present in the polymer composition in an amount of less than 10% or in some cases less than about 5% by weight, such as less than about 1.5% by weight, such as less than about 1% by weight but greater than about 0.1% by weight.

In one embodiment, the crosslinking agent may include epoxy-functional methacrylic monomer units. As used herein, the term methacrylic generally refers to both acrylic and methacrylic monomers, as well as salts and esters thereof, e.g., acrylate and methacrylate monomers. Epoxy-functional methacrylic monomers that may be utilized as the crosslinking agent include, but are not limited to, those containing 1,2-epoxy groups, such as glycidyl acrylate and glycidyl methacrylate. Other suitable epoxy-functional monomers include allyl glycidyl ether, glycidyl ethacrylate, and glycidyl itoconate. In general, the epoxy-functional methacrylic monomer units may be present in the polymer composition in an amount of less than 24%, such as less than about 7.5% by weight, such as less than about 6% by weight but greater than about 0.1% by weight, such as greater than about 1% by weight, such as greater than about 2.5% by weight, such as greater than about 5% by weight.

Adding an antiplasticizer to the composition may also increase oil resistance. Antiplasticizers leads to hindrance of the short scale cooperative motions in the glassy state due to a dynamic coupling between polymer chains and antiplasticizer moleculer with high specific interactions. Antiplasticizers which may be used include compatible additives that can be: (1) highly polar molecules with halogen, nitrogen, oxygen or sulfur atoms, and/or (2) contains at least two nonbridge rings, and/or (3) have a glass transition temperature (Tg) of greater than −50° C., and/or (4) have one dimension less than about 5.5 A in at least 65% of the length of the molecules. Examples of antiplasticizers that may be used include chlorinated biphenyls or terphenyls, polystyrene glycol, abitec acid, di-(2-ethylhexyl) azelate, dioctylsulfosuccinate, sulfonated fatty acids, sulfonated polyesters, alkylbenzene or toluene sulfonamides, higher molecular weight sulfonamides, polyethylene glycol di-(2-ethyl hexanoate), polyethylene glycol dilaurate, etc.

In general, an antiplasticizer may comprise any suitable plasticizer added in small amounts to the composition that increases stiffness and also possibly increases tensile strength. For instance, the antiplasticizer may comprise a plasticizer that is present in the composition in an amount less than about 4% by weight, such as in an amount less than 3.5% by weight, such as in an amount less than about 3% by weight, such as in an amount less than about 2.5% by weight, such as in an amount less than about 2% by weight. The antiplasticizer is generally present in an amount of at least 0.25% by weight, such as in an amount of at least 0.5% by weight.

Antiplasticizers that may be used in accordance with the present disclosure can have a molecular weight ranging from about 100 g/mol to about 1000 g/mol and/or can be a liquid or have a solid amorphous phase within the range of from about −20° C. to about 100° C. Further examples of antiplasticizers include aromatic esters, aliphatic diesters, sulfonamides, glycols, polyethers, polybutenes, acetylated monoglycerides, alkyl citrates, organophosphates, and mixtures thereof.

In addition to the above components, the polymer composition may include various other ingredients. Colorants that may be used include any desired inorganic pigments, such as titanium dioxide, ultramarine blue, cobalt blue, and other organic pigments and dyes, such as phthalocyanines, anthraquinones, Holcomax black 69969 and the like. Other colorants include carbon black or various other polymer-soluble dyes. The colorants can generally be present in the composition in an amount up to about 5 percent by weight. Other special effect additives can be utilized to achieve metal like appearance or special effects such as titanium oxide, coated aluminum flakes, PE wax or acrylic coated aluminum flakes etc.

In one embodiment, for instance, the polymer composition of the present disclosure may be combined with a metallic pigment in order to produce molded articles having a metal-like appearance. In one embodiment, the metallic pigment may comprise an aluminum pigment that contains elemental aluminum. In another embodiment, the metallic pigment may comprise mica. In another embodiment, the metallic pigment may comprise a combination of the aluminum pigment that contains elemental aluminum and mica.

In one embodiment, the metallic pigment incorporated into the composition comprises an aluminum pigment that contains elemental aluminum. The aluminum can be present in any suitable form. For example, the aluminum pigment may have a rod-like shape, a circular shape, a granular shape, or a spherical shape. In one embodiment, the aluminum particles may have a plate-like shape and may comprise, for instance, aluminum flakes. In this regard, the aluminum particles can have an aspect ratio of greater than about 4 to 1, such as greater than about 8 to 1, such as from about 10 to 1 to about 50 to 1.

In another embodiment, the metallic pigment incorporated into the composition comprises mica. In one particular embodiment, the mica may be in the form of a powder.

In one embodiment, the metallic pigment may comprise a coating or carrier. For instance, the coating or carrier may comprise mineral oil, dioctyl adipate, a phthalate such as diisodecylphthalate, titanium dioxide, an acrylic, a polyolefin wax such as a polyethylene wax, or a mixture thereof. The concentration of the coating or carrier may be greater than about 5 wt. %, such as greater than about 15 wt. %, such as greater than about 25 wt. % and less than about 70 wt. %, such as less than about 50 wt. %, such as less than about 45 wt. %, based on the total weight of the metallic pigment.

In particular, the concentration of the mineral oil may be from about 5 wt. % to about 35 wt. %, based on the total weight of the metallic pigment. The concentration of dioctyl adipate may be from about 5 wt. % to about 35 wt. %, based on the total weight of the metallic pigment. The concentration of the acrylic may be from about 5 wt. % to about 25 wt. %, based on the total weight of the metallic pigment. The concentration of the polyolefin wax may be from about 5 wt. % to about 70 wt. %, such as from about 5 wt. % to about 35 wt. %, based on the total weight of the metallic pigment.

In general, the polymer composition may contain the metal pigment in an amount from about 0.5% to about 12% by weight. For instance, the composition may contain the metal pigment in an amount greater than about 1% by weight, such as an amount greater than 2% by weight, such as an amount greater than about 3% by weight, such as an amount greater than about 4% by weight, such as an amount greater than about 5% by weight. The metal pigment is generally present in an amount less than about 12% by weight, such as an amount less than about 10% by weight, such as an amount less than about 8% by weight. In one embodiment, for instance, sufficient metallic pigment may be incorporated into the composition such that molded articles have an appearance of a chrome-plated part.

In order to incorporate the metallic pigment into the polymer composition, in one embodiment, the components can be melt blended during the production of a molded article. In an alternative embodiment, the metallic pigment can be compounded with one or more of the polymers, such as the polyester elastomer.

In one embodiment, the metallic pigment may be incorporated into the polymer composition such that molded articles produced from the composition have a metallic appearance or high gloss surface. For instance, the exterior surface of the molded article may exhibit a gloss of greater than about 30 gloss units, such as greater than about 40 gloss units, such as greater than about 50 gloss units, when measured at a 60° angle using a gloss meter. The surface gloss is generally less than about 70 gloss units, such as less than about 65 gloss units.

In one particular embodiment, a metallic pigment is used that comprises plate-like particles that have an average median particle size of from about 12 microns to about 20 microns, such as from about 14 microns to about 18 microns. The metallic particles may be polished and have a lenticular appearance.

In one embodiment, the polymer composition can also contain an acid scavenger. An acid scavenger may be used to combine with any acid, such as acetic acid, that may occur during processing or during use of the polymer composition. When present, the acid scavenger may prevent polymer degradation due to the evolution of an acid from the polymer. Examples of acid scavengers include the antioxidants described below.

Antioxidants that may be present in the composition include sterically hindered phenol compounds. The antioxidants may provide thermal stability during and after molding and/or any secondary processing. Examples of such compounds, which are available commercially, are pentaerythritol tetrakis[3-(3,5-di-tert-butyl-4-hydroxyphenyl)propionate] (Irganox 1010, BASF), triethylene glycol bis[3-(3-tert-butyl-4-hydroxy-5-methylphenyl)propionate] (Irganox 245, BASF), 3,3'-bis[3-(3,5-di-tert-butyl-4-hydroxyphenyl) propionohydrazide] (Irganox MD 1024, BASF), hexamethylene glycol bis[3-(3,5-di-tert-butyl-4-hydroxyphenyl)propionate] (Irganox 259, BASF), 3,5-di-tert-butyl-4-hydroxytoluene (Lowinox BHT, Chemtura) and n-octadecyl-β-(4-hydroxy-3,5-di-tert-butyl-phenyl)propionate. In one embodiment, for instance, the antioxidant comprises tetrakis[methylene(3,5-di-tert-butyl-4-hydroxyhydrocinnamate)]methane. In an alternative embodiment, the antioxidant may comprise beta-laurylthiopropionate. The antioxidant may be present in the composition in an amount less than 2% by weight, such as in an amount from about 0.1 to about 1.5% by weight.

Light stabilizers that may be present in the composition include sterically hindered amines. Such compounds include 2,2,6,6-tetramethyl-4-piperidyl compounds, e.g., bis(2,2,6,6-tetramethyl-4-piperidyl) sebacate (Tinuvin 770, BASF) or the polymer of dimethyl succinate and 1-(2-hydroxyethyl)-4-hydroxy-2,2,6,6-tetramethyl-4-piperidine (Tinuvin 622, BASF). UV absorbers that may be present in the composition include benzophenones or benzotriazoles. Any suitable benzophenone or benzotriazole may be used in accordance with the present disclosure. The light stabilizer and UV absorber may improve weatherability and may be present in an amount from about 0.1% to about 3% by weight, such as from about 0.5% to about 1.5% by weight.

In one embodiment, the polymer composition may contain a blend of a light stabilizer and a UV absorber. The blend may also provide ultraviolet light resistance and color stability that prevents color fading. In one embodiment, the polymer composition may contain a combination of a benzotriazole or benzophenone UV absorber and a hindered amine light stabilizer such as an oligomeric hindered amine.

Fillers that may be included in the composition include glass beads, wollastonite, loam, molybdenum disulfide or graphite, inorganic or organic fibers such as glass fibers, carbon fibers or aramid fibers. The glass fibers, for instance, may have a length of greater than about 3 mm, such as from 5 to about 50 mm.

In one embodiment, a nucleating agent may be present in the composition. The nucleating agent may comprise a particulate filler, such as a mineral filler. Nucleating agents include talc, clay, silica, calcium silicate, mica, calcium carbonate, titanium dioxide, and the like. The nucleating agent may be present in the composition in an amount from about 0.5% to about 50% by weight, such as from about 0.5% to about 15% by weight.

Various other stabilizers may also be present in the composition. For instance, in one embodiment, the composition may contain a phosphite, such as a diphosphite. For instance, in one embodiment, the phosphite compound may comprise a pentaerythritol phosphite, a pentaerythritol diphosphite, or a distearyl pentaerythritol diphosphite. The phosphite compound may also comprise bis(2,4-ditert-butylphenyl)pentaerythritol diphosphite. The phosphite compound may also comprise O,O'-Dioctadecylpentaerythritol bis(phosphite). An organophosphite processing stabilizer as described above may be present in the polymer composition in an amount less than about 2% by weight, such as in an amount from about 0.1% to about 1.5% by weight.

Another component that may be present in the polymer composition is a coupling agent. The coupling agent may comprise a titanate, a zirconate, or an aluminate organometallic. The organometallic coupling agent can be capable of bonding dissimilar materials contained in the composition. One example of a coupling agent is isooctanol hydrogen phosphate zirconium. The coupling agent can be present in the composition in an amount from about 0.05% to about 3% by weight, such as from about 0.1% to about 1% by weight.

In order to produce molded articles in accordance with the present disclosure, the different components of the polymer composition can be dry blended together in a drum tumbler or in a high intensity mixer. The premixed blends can then be melt blended and extruded as pellets. The pellets can then be used in an injection molding process, or extrusion process. The composition can also be process to form films such as cast films or blown films.

In one embodiment, for injection molding, the polymer composition may comprise an ethylene vinyl acetate random copolymer and a thermoplastic polyester elastomer.

The present disclosure may be better understood with reference to the following example.

EXAMPLE

The following thermoplastic molding compositions were formulated in accordance with the present disclosure and tested for oil resistance in addition to other physical, thermal, and chemical properties. The thermoplastic molding compounds contained a certain combination and ratio of ethylene vinyl acetate (EVA) copolymers and copolyester elastomer (COPE) components that are dry blended, with or without stabilizers, nucleating agents, mold release agents, UV additives, and oleophobic additives, together in a drum tumbler depending upon the required property.

The premixed ingredients were melt-blended and extruded as pellets in a WLE-25 extruder having a SC-202 screw design under the following temperature settings: 50-80° C. in barrel zone 1; 120-130° C. in barrel zone 2; 120-180° C. in barrel zone 3; 160-190° C. in barrel zone 4, 5, and 6; a die head temperature of 180-200° C.; and a melt temperature of 180-220° C. The screw speed was set at, for example, 250 RPM with 50% torque. The die vacuum was at 25 mm of Hg and the throughput was 40-50 lbs/hr.

Each formulation was conventionally injection molded after the pellets were dried at 60-75° C. for four hours to a moisture level of 0.004% using a 4 oz. Demag 661 molding machine. The temperature settings were as follows: 170-175° C. in the rear barrel zone; 180-190° C. in the middle barrel zone, front barrel zone, nozzle zone, and melt zone; and 20-40° C. in the moveable mold zone and the stationary mold zone.

The properties, highlighted in the following tables, were determined based on ISO testing procedures. The following are the ISO test numbers for each property tested: ISO 306 for the vicat softening test; ISO 868 for the shore D hardness test; ISO 178 for all the flex properties tested; ISO 105, ASTM D2244, ASTM D1729 for the color test; ISO 34 for tear strength; and ISO 10012 for the weight change, thickness change, and width change tests.

The composition, as well as typical physical and thermal properties, of EVA and polyester elastomer compositions are shown in the tables below. The total weight percent of all components in a composition is equal to 100.

|  | Compositions | | |
|---|---|---|---|
|  | Sample 1 | Sample 2 | Sample 3 |
| Components |  |  |  |
| Copolyester elastomer (25 Shore D Hardness) | 46.1 | 50.5 | 100 |
| Ethylene Vinyl Acetate Copolymer (33% Vinyl Acetate) | 52 | 49 |  |
| Tetrakis[methylene-β-(3,5-di-tert-butyl-4-hydroxy phenyl)-propionate] methane | 0.3 | 0.3 |  |
| Bis-(2,4-di-t-butylphenol) Pentaerythritol Diphosphite | 0.2 | 0.2 |  |
| 2-(2H-benzotriazol-2-yl)-4-(1,1,3,3-tetramethylbutyl)phenol | 0.7 |  |  |
| Polymer of 2,2,4,4-tetramethyl-7-oxa-3,20-diaza-dispiro [5.1.11.2]-heneicosan-21-on and epichlorohydrin | 0.7 |  |  |
| Unaged properties |  |  |  |
| Vicat | 40.6 | 39.6 |  |
| Shore D | 17.3 | 17.8 |  |
| Flex Modulus (MPa) | 11 | 12 |  |
| Flex Strength (MPa) | 0.45 | 0.49 |  |
| Color (b*) | 5.08 | 2.4 |  |
| Flex Strength @ 3.5% (MPa) |  |  |  |
| Aged in squalene 5 days at room temp. properties |  |  |  |
| Weight change (%) | 9.2 | 9.5 | 7.2 |
| Thickness change (%) | 5.5 | 3.8 | 3.5 |
| Width change (%) | 3.2 | 3.3 | 3.1 |
| Color (b*) |  |  |  |
| Shore D | 16.5 | 16.9 | 22 |
| Flex Modulus (MPa) | 7 | 8 | 12 |
| Flex Strength @ 3.5% (MPa) | 0.28 | 0.33 | 0.54 |
| Aged in sunscreen 5 days at room temp. properties |  |  |  |
| Weight change (%) | 1.7 | 1.6 | 1.8 |
| Thickness change (%) | 1.8 | −0.2 | 0.5 |
| Width change (%) | 0.6 | 2.0 | 2.3 |
| Color (b*) |  |  |  |
| Shore D | 18.6 | 18.5 | 23.5 |
| Flex Modulus (MPa) | 9 | 10 | 13 |
| Flex Strength @ 3.5% (MPa) | 0.39 | 0.42 | 0.58 |
| Aged in oleic acid 5 days at room temp. properties |  |  |  |
| Weight change (%) | 33.5 | 32.0 | 36.7 |
| Thickness change (%) | 12.5 | 12.6 | 16.5 |
| Width change (%) | 10.4 | 11.5 | 12.0 |
| Color (b*) |  |  |  |
| Shore D | 12.9 | 13.7 | 17.3 |
| Flex Modulus (MPa) | 4 | 4 | 7 |
| Flex Strength @ 3.5% (MPa) | 0.17 | 0.2 | 0.3 |
| Aged in white vinegar 3 hrs at 65° C. |  |  |  |
| Weight change (%) | 0.5 | 0.5 | 1.0 |
| Thickness change (%) | 0.5 | 0.5 | 1.0 |
| Width change (%) | −1.5 | −0.2 | 0 |
| Color (b*) |  |  |  |
| Shore D | 17.6 | 18.1 | 23.4 |
| Flex Modulus (MPa) | 9 | 10 | 13 |
| Flex Strength @ 3.5% (MPa) | 0.34 | 0.38 | 0.58 |

The following table shows the components as well as the physical, thermal, and chemical properties of compositions with oleophobic additives. The total weight percent of all components in a composition is equal to 100.

|  | Compositions | | | | | | | |
| --- | --- | --- | --- | --- | --- | --- | --- | --- |
|  | Sample 4 | Sample 5 | Sample 6 | Sample 7 | Sample 8 | Sample 9 | Sample 10 | Sample 11 |
| Components | | | | | | | | |
| Copolyester elastomer (25 Shore D Hardness) | 100 | 0 | 48.5 | 49.5 | 49.5 | 49.5 | 49.5 | 50.5 |
| Copolyester elastomer (40 Shore D Hardness) | 0 | 49.5 | 0 | 0 | 0 | 0 | 0 | 0 |
| Ethylene Vinyl Acetate Copolymer (19% Vinyl Acetate) | 0 | 50 | 0 | 0 | 0 | 0 | 0 | 0 |
| Ethylene Vinyl Acetate Copolymer (33% Vinyl Acetate) | 0 | 0 | 49 | 49 | 49 | 49 | 49 | 49 |
| Tetrakis[methylene-β-(3,5-di-tert-butyl-4-hydroxy phenyl)-propionate] methane | 0 | 0.3 | 0.3 | 0.3 | 0.3 | 0.3 | 0.3 | 0.3 |
| Bis-(2,4-di-t-butylphenol) Pentaerythritol Diphosphite | 0 | 0.2 | 0.2 | 0.2 | 0.2 | 0.2 | 0.2 | 0.2 |
| Silicone Polymer (UHMW) | 0 | 0 | 2 | 0 | 0 | 0 | 0 | 0 |
| Silicon Fluid | 0 | 0 | 0 | 1 | 0 | 0 | 0 | 0 |
| N,N' Ethylene Bisstearamide | 0 | 0 | 0 | 0 | 1 | 0 | 0 | 0 |
| N,N'-Bis-(2-hydroxyethyl) dodecanamide | 0 | 0 | 0 | 0 | 0 | 1 | 0 | 0 |
| Erucamide ER | 0 | 0 | 0 | 0 | 0 | 0 | 1 | 0 |
| Unaged properties | | | | | | | | |
| Color (b*) | 7.91 | 8.84 | 3.77 | 3.44 | 4.05 | 2.1 | 3.22 | 2.4 |
| Shore D | 23.8 | 34 | 17.9 | 18.6 | 20 | 18.1 | 17 | 17.8 |
| Flex Modulus (MPa) | 14 | 52 | 21 | 20 | 24 | 19 | 21 | 12 |
| Flex Strength @ 3.5% (MPa) | 0.59 | 2.2 | 0.8 | 0.8 | 0.98 | 0.77 | 0.83 | 0.49 |
| Aged in squalene 5 days at room temp. properties | | | | | | | | |
| Weight change (%) | 7.4 | 2.0 | 8.7 | 8.6 | 7.8 | 8.5 | 8.5 | 9.5 |
| Thickness change (%) | 2.7 | 0.6 | 3.6 | 4.0 | 3.7 | 3.6 | 3.6 | 3.8 |
| Width change (%) | 2.5 | 0.9 | 3.8 | 3.7 | 3.3 | 3.4 | 3.8 | 3.3 |
| Color (b*) | 11.93 | 9.76 | 5.81 | 6.65 | 7.1 | 7.46 | 4.49 | 3.11 |
| Shore D | 21.3 | 32.3 | 17.9 | 18 | 19 | 17.4 | 18 | 16.9 |
| Flex Modulus (MPa) | 12 | 39 | 9 | 10 | 12 | 10 | 12 | 8 |
| Flex Strength @ 3.5% (MPa) | 0.61 | 1.75 | 0.43 | 0.42 | 0.55 | 0.42 | 0.52 | 0.33 |
| Aged in sunscreen 5 days at room temp. properties | | | | | | | | |
| Weight change (%) | 2.9 | 1.4 | 1.8 | 2.1 | 1.9 | 2.2 | 2.6 | 1.6 |
| Thickness change (%) | 0.9 | 0.3 | 0.4 | 1.2 | 1.2 | 0.7 | 1.4 | -0.2 |
| Width change (%) | 1.1 | 0.7 | 1.5 | 1.9 | 1.5 | 1.3 | 1.6 | 2.0 |
| Color | 14.61 | 12.82 | 4.51 | 4.05 | 5.98 | 4.89 | 7.11 | 2.47 |
| Shore D | 22.1 | 33.2 | 20.1 | 19.5 | 20.5 | 20 | 18.9 | 18.5 |
| Flex Modulus (MPa) | 16 | 42 | 13 | 12 | 18 | 13 | 14 | 10 |
| Flex Strength @ 3.5% (MPa) | 0.67 | 1.85 | 0.54 | 0.52 | 0.7 | 0.53 | 0.62 | 0.42 |
| Aged in olive oil 5 days at room temp. properties | | | | | | | | |
| Weight change (%) | 3.3 | 0.7 | 3.7 | 3.5 | 3.2 | 3.4 | 3.5 | 4.6 |
| Thickness change (%) | 0.5 | -0.1 | 1.1 | 1.3 | 1.4 | 1.3 | 1.8 | 1.4 |
| Width change (%) | 1.0 | 0.3 | 1.7 | 1.6 | 1.5 | 1.2 | 1.9 | 1.8 |
| Color | 42.49 | 14.63 | 24.83 | 31 | 27.92 | 29.76 | 29.2 | 26.92 |
| Shore D | 22 | 33.3 | 19.5 | 19.7 | 20.3 | 19.6 | 19.4 | 18.5 |
| Flex Modulus (MPa) | 14 | 41 | 11 | 11 | 15 | 12 | 14 | 11 |
| Flex Strength @ 3.5% (MPa) | 0.65 | 1.87 | 0.49 | 0.5 | 0.65 | 0.5 | 0.56 | 0.49 |
| Aged in white vinegar 3 hrs at 65° C. | | | | | | | | |
| Weight change (%) | 1.2 | 0.2 | 0.4 | 0.5 | 0.5 | 0.4 | 0.7 | 0.5 |
| Thickness change (%) | -0.1 | -0.1 | 0.2 | 0.9 | 0.5 | 0.2 | 0.4 | 0.5 |
| Width change (%) | 0.5 | 0.1 | 1.0 | 1.0 | 0.2 | -0.1 | 0.7 | -0.2 |
| Color | 8.21 | 8.91 | 3.5 | 2.68 | 3.35 | 2.17 | 3.14 | 1.43 |
| Shore D | 22.9 | 33.5 | 19.8 | 20 | 20.5 | 19.6 | 17.7 | 18.1 |
| Flex Modulus (MPa) | 14 | 40 | 14 | 11 | 16 | 13 | 14 | 10 |
| Flex Strength @ 3.5% (MPa) | 0.63 | 1.83 | 0.52 | 0.47 | 0.64 | 0.47 | 0.53 | 0.38 |

The following table shows the physical, thermal, and chemical properties of compositions with various combinations of oleophobic additives, nucleating agents, plasticizers, and reactive compatibilizers. The total weight percent of all components in a composition is equal to 100. The S. stands for sample. For example, S. 13 would stand for sample 13.

|  | Compositions |  |  |  |  |  |  |  |  |  |  |  |  |  |
|---|---|---|---|---|---|---|---|---|---|---|---|---|---|---|
|  | S. 12 | S. 13 | S. 14 | S. 15 | S. 16 | S. 17 | S. 18 | S. 19 | S. 20 | S. 21 | S. 22 | S. 23 | S. 24 | S. 25 |
| Components |  |  |  |  |  |  |  |  |  |  |  |  |  |  |
| Copolyester elastomer (25 Shore D Hardness) | 50.1 | 50.1 | 50.1 | 49.2 | 50.2 | 50.1 | 50.2 | 50.1 | 51.9 | 49.9 | 51.9 | 50.9 | 50.9 | 50.7 |
| Ethylene Vinyl Acetate Copolymer (33% Vinyl Acetate) | 47 | 48 | 46 | 42 | 43.5 | 46 | 43.5 | 47 | 25 | 25 | 5 | 5 | 5 | 28 |
| Ethylene Vinyl Acetate Copolymer (28% Vinyl Acetate) |  |  |  |  |  | 2 |  |  |  |  |  |  |  |  |
| 4,4′-Bis (alpha, alpha-dimethylbenzyl) diphenylamine |  |  |  |  |  | 1 |  |  |  |  |  |  |  |  |
| Tetrakis(2,4-di-tert-butylphenyl)[1,1-biphenyl]-4,4′diylbisphosphonite | 0.3 | 0.3 | 0.3 | 0.3 |  | 0.5 |  | 0.3 | 0.5 | 0.5 | 0.5 | 0.5 | 0.5 |  |
| Polymer of 2,2,4,4-tetramethyl-7-oxa-3,20-diaza-dis-piro [5.1.11.2]-heneicosan-21-on and epichlorohydrin | 0.2 | 0.2 | 0.2 |  |  |  |  | 0.2 | 0.2 | 0.2 | 0.2 | 0.2 | 0.2 |  |
| 2-(2H-benzotriazol-2-yl)-4-(1,1,3,3-tetramethylbutyl)phenol | 0.2 | 0.2 | 0.2 |  |  |  |  | 0.2 |  |  |  |  |  |  |
| 2-(2-Hydroxy-5-t-octylphenyl)-benzotriazole |  |  |  |  |  |  |  |  | 0.2 | 0.2 | 0.2 | 0.2 | 0.2 |  |
| N-methylated oligomeric, high molecular weight hindered amine light stabilizer | 0.2 | 0.2 | 0.2 |  |  |  |  | 0.2 | 0.2 | 0.2 | 0.2 | 0.2 | 0.2 |  |
| Polyamide terpolymer that is amine functional |  |  |  |  |  |  |  |  |  |  |  |  |  | 1 |
| Erucamide |  | 1 | 1 | 0.5 |  | 0.2 |  |  |  |  |  |  |  |  |
| Crodamide AT-468 Bead |  |  |  |  |  |  |  | 2 |  |  |  |  |  |  |
| Talc |  |  |  |  |  | 0.1 |  |  |  |  |  |  |  |  |
| Neutral ester wax Nucleating agent |  |  |  |  |  | 0.1 |  |  |  |  |  |  |  |  |
| Ethylene-ethyl acetate copolymer |  |  |  | 5 | 5 |  | 5 |  | 22 | 22 | 40 | 40 | 40 | 20 |
| Polyvinyl alcohol |  |  |  |  | 1 |  |  |  |  |  |  |  |  |  |
| Octadecyl 3-(3,5-di-tert-butyl-4-hydroxyphenyl) propionate |  |  |  |  | 0.3 |  | 0.3 |  |  |  |  |  |  | 0.3 |
| Thermoplastic Elastomer |  |  |  |  |  |  | 1 |  |  |  |  |  |  |  |
| Sucrose benzoate |  |  |  | 2 |  |  |  |  |  |  |  |  |  |  |
| PEG - di laurate |  |  |  |  |  |  |  |  |  |  |  | 1 |  |  |
| N-Butylbenzene sulfonamide |  |  |  |  |  |  |  |  |  |  |  |  | 1 |  |
| Silicone Polymer (UHMW) | 2 |  | 2 | 1 |  |  |  |  | 2 |  | 2 | 2 | 2 |  |
| Unaged Properties |  |  |  |  |  |  |  |  |  |  |  |  |  |  |
| MFR (190 C./2.16) | 24.18 | 26.92 | 26.69 | 25.33 | 22.69 | 24.84 | 23.87 | 27.05 | 26.5 | 27.85 | 27.52 | 30.96 | 27.73 | 25.1 |
| Flex Modulus (23 C.) | 13 | 13 | 14 | 12 | 13 | 12 | 12 | 14 | 12 | 12 | 10 | 10 | 10 | 11 |
| Flex stress at 3.5% | 0.6 | 0.55 | 0.57 | 0.5 | 0.51 | 0.57 | 0.51 | 0.59 | 0.45 | 0.46 | 0.4 | 0.39 | 0.39 | 0.48 |
| Hardness-Shore D | 19.3 | 18.6 | 19.7 | 19.4 | 20.1 | 19.3 | 18.3 | 18.8 | 16.4 | 16.8 | 15.3 | 15.3 | 15.9 | 16.6 |
| Vicat | 39.9 | 40.6 | 38.5 | 40.5 | 39.3 | 40.7 | 39.8 | 40.1 |  |  |  |  |  |  |
| Tear strength-kN/m | 54.5 | 56.2 | 58.5 |  |  |  |  | 55.2 | 38.8 | 41.3 | 41.2 | 41.5 | 41.8 | 45 |
| Color (b*) | 6.69 | 7.19 | 7.72 |  |  |  |  | 8.38 | 5.1 | 6.24 | 6.28 | 5.91 | 6.09 |  |
| Aged in olive oil 5 days at room temp. properties |  |  |  |  |  |  |  |  |  |  |  |  |  |  |
| Weight change (%) | 3.88 | 3.82 | 3.83 |  |  |  |  | 3.75 | 5.30 | 5.32 | 6.32 | 6.33 | 6.03 |  |
| Thickness change (%) | 1.45 | 2.20 | 1.22 |  |  |  |  |  | 2.84 | 2.29 | 3.51 | 3.19 | 3.34 |  |
| Width change (%) | 1.07 | 1.92 | 0.49 |  |  |  |  |  | 1.88 | 1.04 | 1.65 | 1.07 | 2.22 |  |
| Color (b*) | 28.8 | 29.6 | 6.93 |  |  |  |  | 33.92 | 25.48 | 27.75 | 32 | 35.78 | 35.92 |  |
| % Change in b* | 330.49 | 311.68 | −10.23 |  |  |  |  | 304.77 | 399.61 | 344.71 | 409.55 | 505.41 | 489.82 |  |
| Shore D | 18.7 | 18.3 | 18.2 |  |  |  |  |  | 15.7 | 15.5 | 14.3 | 13.9 | 14.6 |  |
| % Change in Shore D | −3.11 | −1.61 | −7.61 |  |  |  |  |  | −4.27 | −7.74 | −6.54 | −9.15 | −8.18 |  |
| Flex Modulus (MPa) | 12 | 13 | 12 |  |  |  |  |  | 9 | 9 | 8 | 8 | 7 |  |

-continued

| | Compositions | | | | | | | | | | | | | |
|---|---|---|---|---|---|---|---|---|---|---|---|---|---|---|
| | S. 12 | S. 13 | S. 14 | S. 15 | S. 16 | S. 17 | S. 18 | S. 19 | S. 20 | S. 21 | S. 22 | S. 23 | S. 24 | S. 25 |
| % change in Flex Modulus | −7.69 | 0.00 | −14.29 | | | | | | −25.00 | −25.00 | −20.00 | −20.00 | −30.00 | |
| Flex Strength @ 3.5% (MPa) | 0.57 | 0.55 | 0.55 | | | | | | 0.42 | 0.42 | 0.36 | 0.34 | 0.35 | |
| % change in Flex Strength | −5.00 | 0.00 | −3.51 | | | | | | −6.67 | −8.70 | −10.00 | −12.82 | −10.26 | |

In the following samples, the amount of the EVA component in relation to the amount of the copolyester component was varied.

| | Compositions | | | | | |
|---|---|---|---|---|---|---|
| | S. 26 | S. 27 | S. 28 | S. 29 | S. 30 | S. 31 |
| Components | | | | | | |
| Copolyester elastomer (25 Shore D Hardness) | 73 | 58 | 49 | 38 | 23 | 48.5 |
| Ethylene Vinyl Acetate Copolymer (33% Vinyl Acetate) | 25 | 40 | 49 | 60 | 75 | 48.5 |
| Tetrakis(2,4-di-tert-butylphenyl)[1,1-biphenyl]-4,4'diylbisphosphonite | 0.3 | 0.3 | 0.3 | 0.3 | 0.3 | 0.3 |
| Polymer of 2,2,4,4-tetramethyl-7-oxa-3,20-diaza-dispiro [5.1.11.2]-heneicosan-21-on and epichlorohydrin | 0.2 | 0.2 | 0.2 | 0.2 | 0.2 | 0.2 |
| 2-(2H-benzotriazol-2-yl)-4-(1,1,3,3-tetramethylbutyl)phenol | 0.2 | 0.2 | 0.2 | 0.2 | 0.2 | 0.2 |
| N-methylated oligomeric, high molecular weight hindered amine light stabilizer | 0.2 | 0.2 | 0.2 | 0.2 | 0.2 | 0.2 |
| Talc | 0.1 | 0.1 | 0.1 | 0.1 | 0.1 | 0.1 |
| Silicone Polymer (UHMW) | 1 | 1 | 1 | 1 | 1 | 1 |
| Thermoplastic Elastomer | | | | | | 1 |
| Unaged Properties | | | | | | |
| MFR (190 C./2.16) | 17.37 | 21.19 | 25.15 | 35.24 | 38.43 | 26.32 |
| Color (b*) | 8.24 | 6.63 | 5.97 | 4.69 | 4.71 | 6.02 |
| Shore D | 19.8 | 19.1 | 18.9 | 18.3 | 18.1 | 19.3 |
| Flex Modulus (MPa) | 12 | 13 | 12 | 13 | 12 | 14 |
| Flex Strength @ 3.5% (MPa) | 0.59 | 0.59 | 0.56 | 0.53 | 0.49 | 0.55 |
| Tear Strength | 47.6 | 43.3 | 39.1 | 38.3 | 37.8 | 38.9 |
| Aged in olive oil 5 days room temp. properties | | | | | | |
| Weight change (%) | 4.07% | 4.15% | 4.37% | 4.54% | 4.88% | 4.23% |
| Thickness change (%) | 1.37% | 1.71% | 1.63% | 1.85% | 1.88% | 1.60% |
| Width change (%) | 0.96% | 0.78% | 1.55% | 1.25% | 2.25% | 1.54% |
| Color (b*) | 33.28 | 36.07 | 32.31 | 22.97 | 27.77 | 30.5 |
| Shore D | 18.3 | 17.8 | 17.1 | 16.6 | 16.1 | 17.6 |
| Flex Modulus (MPa) | 12 | 11 | 10 | 9 | 10 | 11 |
| % change | 0.00 | −15.38 | −16.67 | −30.77 | −16.67 | −21.43 |
| Flex Strength @ 3.5% (MPa) | 0.53 | 0.5 | 0.48 | 0.46 | 0.42 | 0.49 |
| % change | −10.17 | −15.25 | −14.29 | −13.21 | −14.29 | −10.91 |

In the following samples, the amount of a crosslinking agent and the amount of a compatibilizer were varied and unaged properties were determined.

| | Compositions | | | | | | | |
|---|---|---|---|---|---|---|---|---|
| | S. 32 | S. 33 | S. 34 | S. 35 | S. 36 | S. 37 | S. 38 | S. 39 |
| Components | | | | | | | | |
| Copolyester elastomer (25 Shore D Hardness) | 49.5 | 49 | 46.5 | 49 | 46.5 | 49 | 49 | 46.5 |
| Ethylene Vinyl Acetate Copolymer (28% Vinyl Acetate) | 49.5 | 49 | 47.5 | 49 | 47.5 | 49 | 49 | 46.5 |
| Tetrakis(2,4-di-tert-butylphenyl)[1,1-biphenyl]-4,4'diylbisphosphonite | 0.3 | 0.3 | 0.3 | 0.3 | 0.3 | 0.3 | 0.3 | 0.3 |

|  | Compositions | | | | | | | |
| --- | --- | --- | --- | --- | --- | --- | --- | --- |
|  | S. 32 | S. 33 | S. 34 | S. 35 | S. 36 | S. 37 | S. 38 | S. 39 |
| Polymer of 2,2,4,4-tetramethyl-7-oxa-3,20-diaza-dispiro [5.1.11.2]-heneicosan-21-on and epichlorohydrin | 0.2 | 0.2 | 0.2 | 0.2 | 0.2 | 0.2 | 0.2 | 0.2 |
| 2-(2H-benzotriazol-2-yl)-4-(1,1,3,3-tetramethylbutyl)phenol | 0.2 | 0.2 | 0.2 | 0.2 | 0.2 | 0.2 | 0.2 | 0.2 |
| N-methylated oligomeric, high molecular weight hindered amine light stabilizer | 0.2 | 0.2 | 0.2 | 0.2 | 0.2 | 0.2 | 0.2 | 0.2 |
| Crodamide AT-468 Bead |  |  |  |  |  |  |  | 1 |
| Talc | 0.1 | 0.1 | 0.1 | 0.1 | 0.1 | 0.1 | 0.1 | 0.1 |
| Epoxy cresol novolac resin |  |  |  |  |  |  | 1 |  |
| Terpolymer Ethylene - Acrylic Ester- Glycidyl Methacrylate (GMA) |  | 1 | 5 |  |  |  |  |  |
| Copolymer Ethylene - Glycidyl Methacrylate |  |  |  | 1 | 5 |  |  |  |
| Joncryl polyepoxy resin based on a styren, methacrylic acid backbone |  |  |  |  |  | 1 |  |  |
| Silicone Polymer (UHMW) |  |  |  |  |  |  |  | 5 |
| Unaged Properties | | | | | | | | |
| MFR (190 C./2.16) | 20.07 | 19.68 | 19.51 | 14.63 | 7.88 | 4.33 | 6.04 | 10.44 |
| Flex Modulus (23 C.) | 17 | 17 | 17 | 18 | 20 | 17 | 19 | 15 |
| Flex stress at 3.5% | 0.66 | 0.64 | 0.62 | 0.68 | 0.78 | 0.66 | 0.7 | 0.7 |
| Hardness-Shore D | 23 | 23 | 21.7 | 24 | 25.3 | 24.9 | 25.2 | 20.9 |
| Vicat | 46.3 | 45.2 | 43.1 | 45.2 | 50.2 | 48.9 |  | 48.6 |
| Tear strength-kN/m | 47 | 44.4 | 44.1 | 46.6 | 45.8 | 47.9 | 46.8 | 51 |
| b* | 6.46 | 6.2 | 6.12 | 6.31 | 7.07 | 6.43 | 7.33 | 7.79 |
| % weight changed in olive oil | 2.68 | 2.74 | 2.7 | 2.49 | 1.87 | 1.99 | 2.05 | 2.14 |
| Delta E in olive oil | 20.56858 | 20.48184 | 19.59092 | 18.75071 | 15.62337 | 17.90891 | 17.90593 | 15.93341 |
| B* after olive oil exposure | 26.49 | 26.03 | 24.83 | 24.11 | 21.62 | 22.98 | 24.19 | 22.84 |
| % change in b* | 310.06 | 319.84 | 305.72 | 282.09 | 205.80 | 257.39 | 230.01 | 193.20 |

In the following samples, different plasticizers were used at five percent of the total weight percentage of the composition, and the properties of the composition were determined.

|  | Compositions | | | | | | |
| --- | --- | --- | --- | --- | --- | --- | --- |
|  | S. 40 | S. 41 | S. 42 | S. 43 | S. 44 | S. 45 | S. 46 |
| Components | | | | | | | |
| Copolyester elastomer (25 Shore D Hardness) | 50.8 | 49.8 | 49.8 | 49.8 | 49.8 | 49.8 | 49.8 |
| Ethylene Vinyl Acetate Copolymer (33% Vinyl Acetate) | 24 | 22 | 22 | 22 | 22 | 22 | 22 |
| Tetrakis(2,4-di-tert-butylphenyl)[1,1-biphenyl]-4,4'diylbisphosphonite | 0.5 | 0.5 | 0.5 | 0.5 | 0.5 | 0.5 | 0.5 |
| Polymer of 2,2,4,4-tetramethyl-7-oxa-3,20-diaza-dis-piro [5.1.11.2]-heneicosan-21-on and epichlorohydrin | 0.2 | 0.2 | 0.2 | 0.2 | 0.2 | 0.2 | 0.2 |
| 2-(2-Hydroxy-5-t-octylphenyl)-benzotriazole | 0.2 | 0.2 | 0.2 | 0.2 | 0.2 | 0.2 | 0.2 |
| N-methylated oligomeric, high molecular weight hindered amine light stabilizer | 0.2 | 0.2 | 0.2 | 0.2 | 0.2 | 0.2 | 0.2 |
| Talc | 0.1 | 0.1 | 0.1 | 0.1 | 0.1 | 0.1 | 0.1 |
| Ethylene-ethyl acetate copolymer | 24 | 22 | 22 | 22 | 22 | 22 | 22 |
| PEG di-2-ethylhexoate |  |  | 5 |  |  |  |  |
| PEG - di laurate |  |  |  |  |  |  | 5 |
| Neopentyl glycol dibenzoate |  | 5 |  |  |  |  |  |
| Tetraethylene glycol ester |  |  |  |  |  | 5 |  |
| Triethylene glycol bis (2-ethylhexanoate) |  |  |  |  | 5 |  |  |
| Di (2-ethylhexyl) Azelate |  |  |  | 5 |  |  |  |

-continued

|  | Compositions | | | | | | |
| --- | --- | --- | --- | --- | --- | --- | --- |
|  | S. 40 | S. 41 | S. 42 | S. 43 | S. 44 | S. 45 | S. 46 |
| Properties | | | | | | | |
| MFR (190 C./2.16) | 26.7 | 32.31 | 36.29 | 37.31 | 36.84 | 37.08 | 40.35 |
| Flex Modulus (23 C.) | 8 | 7 | 6 | 5 | 7 | 7 | 5 |
| Flex stress at 3.5% | 0.36 | 0.33 | 0.32 | 0.31 | 0.33 | 0.33 | 0.32 |
| Hardness-Shore D | 14.7 | 13.9 | 13.7 | 13.5 | 13.7 | 13.3 | 13.5 |
| DTUL-0.45 | 23 | 23 | 23 | 23 | 23 | 23 | 23 |
| Vicat | 40.1 | 36.9 | 36.4 | 36.4 | 38.2 | 37.2 | 36.7 |
| Tear strength-kN/m | 41.1 | 41.5 | 37.9 | 39 | 38.5 | 36.5 | 36.9 |
| Density | 1.0047 | 1.0023 | 1.0078 | 1.0098 | 1.0046 | 1.0064 | 1.0068 |
| UL94 | | | | | | | |
| b* | 4.17 | 5.46 | 4.99 | 4.91 | 3.11 | 5.66 | 4.6 |
| % Weight uptake in olive oil | 5.6 | 4.46 | 4.76 | 4.32 | 4.28 | 4.29 | 4.98 |
| Delta E value | 31.01597 | 22.22966 | 23.40084 | 28.42431 | 27.00892 | 24.3332 | 27.34097 |
| Color (b*) after oil exposure | 25.67 | 27.19 | 32.43 | 31 | 27.12 | 32.06 | 27.39 |
| % change in b* | 515.59 | 397.99 | 549.90 | 531.36 | 772.03 | 466.43 | 495.43 |
| Shore D after oil exposure | 14.3 | 13.5 | 12.8 | 13.1 | 13.2 | 13.3 | 13.2 |
| %change in shore D | −2.72 | −2.88 | −6.57 | −2.96 | −3.65 | 0.00 | −2.22 |
| Flex Modulus (MPa) | 6 | 6 | 6 | 6 | 7 | 6 | 6 |
| %change | −25.00 | −14.29 | 0.00 | 20.00 | 0.00 | −14.29 | 20.00 |
| Flex Strength @ 3.5% (MPa) | 0.32 | 0.3 | 0.28 | 0.29 | 0.3 | 0.29 | 0.29 |
| % change | −11.11 | −9.09 | −12.50 | −6.45 | −9.09 | −12.12 | −9.38 |

The mechanical properties are dominated by the COPE component and there was no sign of evolution of acetic acid or polymer degradation. While the original polyether polyester elastomer had a yellow appearance, these blends were brighter and lighter in color and somewhat translucent depending on the percentage of ethylene vinyl acetate copolymer.

All of the compositions, when made into a molded part, delivered a good smooth surface outside and showed no signs of a tendency to trap air. The wall thickness distribution was fairly uniform and the inner surface was also reasonably smooth.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed:

1. A polymer composition comprising a blend of:
   a thermoplastic copolyester elastomer;
   a second polymer comprising an olefin and vinyl acetate copolymer, and wherein the weight ratio between the thermoplastic copolyester elastomer and the olefin and vinyl acetate copolymer is from about 20:80 to about 80:20; and
   an oleophobic agent comprising an ultrahigh molecular weight silicone.

2. A polymer composition as defined in claim 1, wherein the ultrahigh molecular weight silicone has a kinematic viscosity of greater than about 100,000 $mm^2s^{-1}$.

3. A polymer composition as defined in claim 1, wherein the olephobic agent is present in the composition in an amount from about 0.05% to about 55% by weight.

4. A polymer composition as defined in claim 1, wherein the composition contains a multi-functional crosslinking agent.

5. A polymer composition as defined in claim 1, further containing an antiplasticizer.

6. A polymer composition as defined in claim 1, wherein the olefin and vinyl acetate copolymer contains vinyl acetate in an amount from about 3 weight % to about 50 weight %.

7. A polymer composition as defined in claim 1, wherein the olefin and vinyl acetate copolymer comprises an ethylene vinyl acetate copolymer.

8. A polymer composition as defined in claim 1, wherein the polymer composition further comprises a coupling agent.

9. A polymer composition as defined in claim 1, wherein the polymer composition further comprises a crosslinking agent comprising an epoxy functional group.

10. A polymer composition as defined in claim 1, wherein the thermoplastic copolyester elastomer contains soft segments and hard segments.

11. A polymer composition as defined in claim 1, wherein the thermoplastic copolyester elastomer comprises a multi-block copolyester elastomer.

12. A polymer composition as defined in claim 10 wherein the hard segments comprise ester units and the soft segments comprise an aliphatic polyester or a polyether glycol.

13. A molded article made from the polymer composition defined in claim 1.

14. A cable or wire comprising a coating made from the polymer composition defined in claim 1.

15. A case for an electronic device made from the polymer composition defined in claim 1.

16. A grip or handle made from the polymer composition defined in claim 1.

17. An interior automotive part made from the polymer composition defined in claim 1.

* * * * *